(12) United States Patent
Haldenby et al.

(10) Patent No.: US 11,775,945 B2
(45) Date of Patent: *Oct. 3, 2023

(54) SECURE REAL-TIME PRODUCT OWNERSHIP TRACKING USING DISTRIBUTED ELECTRONIC LEDGERS

(71) Applicant: The Toronto-Dominion Bank, Toronto (CA)

(72) Inventors: Perry Aaron Jones Haldenby, Toronto (CA); Paul Mon-Wah Chan, Toronto (CA); John Jong Suk Lee, Toronto (CA); Yaniv Nathan, Toronto (CA)

(73) Assignee: The Toronto-Dominion Bank, Toronto (CA)

(*) Notice: Subject to any disclaimer, the term of this patent is extended or adjusted under 35 U.S.C. 154(b) by 713 days.

This patent is subject to a terminal disclaimer.

(21) Appl. No.: 16/715,471

(22) Filed: Dec. 16, 2019

(65) Prior Publication Data
US 2020/0118094 A1    Apr. 16, 2020

Related U.S. Application Data

(63) Continuation of application No. 15/232,100, filed on Aug. 9, 2016, now Pat. No. 10,558,955.
(Continued)

(51) Int. Cl.
*G06Q 20/06* (2012.01)
*G06Q 20/10* (2012.01)
(Continued)

(52) U.S. Cl.
CPC ......... *G06Q 20/0655* (2013.01); *G06F 21/62* (2013.01); *G06F 21/645* (2013.01);
(Continued)

(58) Field of Classification Search
None
See application file for complete search history.

(56) References Cited

U.S. PATENT DOCUMENTS 5,892,900 A * 4/1999 Ginter .................... G06F 21/78
    726/26
7,656,271 B2 * 2/2010 Ehrman ................... H04L 9/40
    701/1
(Continued)

OTHER PUBLICATIONS

Tardi, Genesis Block Definition (Year: 2022).*
(Continued)

*Primary Examiner* — John W Hayes
*Assistant Examiner* — Dennis G Keritsis
(74) *Attorney, Agent, or Firm* — Duane Morris LLP

(57) ABSTRACT

A processor receives a signal representing data including event information detailing an event involving an entity having a registered ownership interest in a product and loads a portion of a distributed electronic ledger for tracking ownership information associated with the product. The distributed electronic ledger includes, within a block thereof and associated with the product, an event trigger list including entity data associated with each entity having a registered ownership interest in the product and a rules engine including rules associated with event triggers in the event trigger list. The processor determines whether a triggering event corresponding to the event is stored in the event trigger list and, when the event has a corresponding triggering event, determines the associated rule within the rules engine. The processor updates and saves the distributed electronic ledger by performing an action specified by the determined associated rule.

21 Claims, 12 Drawing Sheets

Related U.S. Application Data

(60) Provisional application No. 62/204,768, filed on Aug. 13, 2015.

(51) Int. Cl.

| | | |
|---|---|---|
| *G06Q 20/40* | (2012.01) | |
| *G06F 21/64* | (2013.01) | |
| *H04N 5/913* | (2006.01) | |
| *G06Q 20/36* | (2012.01) | |
| *G06Q 10/0631* | (2023.01) | |
| *G06Q 10/10* | (2023.01) | |
| *G06Q 10/1093* | (2023.01) | |
| *G06Q 50/08* | (2012.01) | |
| *G06F 21/62* | (2013.01) | |
| *H04L 9/08* | (2006.01) | |
| *G06Q 50/18* | (2012.01) | |
| *H04L 9/32* | (2006.01) | |
| *H04L 9/40* | (2022.01) | |
| *G06Q 10/08* | (2023.01) | |
| *G06Q 30/0214* | (2023.01) | |
| *G06Q 40/12* | (2023.01) | |
| *G06Q 40/08* | (2012.01) | |
| *G06Q 20/38* | (2012.01) | |
| *H04L 9/00* | (2022.01) | |

(52) U.S. Cl.
CPC .................. *G06Q 10/0631* (2013.01); *G06Q 10/063114* (2013.01); *G06Q 10/08* (2013.01); *G06Q 10/103* (2013.01); *G06Q 10/1097* (2013.01); *G06Q 20/065* (2013.01); *G06Q 20/102* (2013.01); *G06Q 20/367* (2013.01); *G06Q 20/3829* (2013.01); *G06Q 20/401* (2013.01); *G06Q 20/405* (2013.01); *G06Q 20/4016* (2013.01); *G06Q 30/0214* (2013.01); *G06Q 40/08* (2013.01); *G06Q 40/128* (2013.12); *G06Q 50/08* (2013.01); *G06Q 50/18* (2013.01); *H04L 9/0816* (2013.01); *H04L 9/0861* (2013.01); *H04L 9/0891* (2013.01); *H04L 9/0894* (2013.01); *H04L 9/3247* (2013.01); *H04L 63/061* (2013.01); *H04L 63/062* (2013.01); *H04L 63/0876* (2013.01); *H04N 5/913* (2013.01); *G06Q 2220/00* (2013.01); *G06Q 2220/10* (2013.01); *G06Q 2230/00* (2013.01); *H04L 9/50* (2022.05); *H04L 63/0435* (2013.01); *H04L 63/0442* (2013.01); *H04L 63/08* (2013.01); *H04L 63/12* (2013.01); *H04L 2209/24* (2013.01); *H04L 2209/56* (2013.01); *H04N 2005/91342* (2013.01); *Y02P 90/80* (2015.11); *Y04S 10/50* (2013.01)

(56) References Cited

U.S. PATENT DOCUMENTS

| | | |
|---|---|---|
| 9,350,599 B1 | 5/2016 | Enright et al. |
| 9,436,923 B1 * | 9/2016 | Sriram ................. H04L 9/3247 |
| 2013/0124868 A1 | 3/2013 | Sorotokin et al. |
| 2014/0196079 A1 | 7/2014 | Jannard et al. |
| 2015/0128240 A1 | 5/2015 | Richards et al. |
| 2016/0098723 A1 | 4/2016 | Feeney |
| 2016/0164884 A1 | 6/2016 | Srinivasan et al. |
| 2016/0259937 A1 * | 9/2016 | Ford ........................ G06F 21/57 |
| 2016/0260169 A1 | 9/2016 | Arnold et al. |
| 2018/0130050 A1 * | 5/2018 | Taylor ................ G06Q 20/3829 |

OTHER PUBLICATIONS

NIST.IR.8202 (Year: 2020).*
IEEE 100 The Authority Dictionary of IEEE Standards Terms (7th Ed.) (Year: 2000).*
Green, A Few Thoughts on Cryptographic Engineering (2012).

* cited by examiner

SECURE REAL-TIME PRODUCT OWNERSHIP TRACKING USING DISTRIBUTED ELECTRONIC LEDGERS

CROSS-REFERENCE TO RELATED APPLICATION

This application is a continuation of, and claims the benefit of priority to, U.S. application Ser. No. 15/232,100, filed Aug. 9, 2016, which claims priority to U.S. Provisional Application No. 62/204,768, filed Aug. 13, 2015. The disclosures of these applications are hereby incorporated by reference to their entireties.

BACKGROUND

Processes that enable product tracking and product ownership tracking, especially joint or partial product ownership tracking, are essential to establish, preserve, and validate ownership rights and responsibilities and avoid costly litigation. However, events that impact entities' ownership in products, and the products themselves, are not efficiently or consistently tracked, leaving the possibility that losses may occur due to fraudulent ownership transfers that are prevalent with some products.

Conventional block-chain ledgers, despite their many advantages, do not provide effective and efficient systems for both tracking and controlling the ownership of products, especially joint or partial ownership of such products. For example, conventional block-chain ledgers make all entries sequentially, which can lead to delays in executing the transactions, and render such ledgers unable to efficiently execute transactions that follow a standardized set of rules based on events associated with owner(s) of products. Conventional block-chain ledgers also could not be adapted to systems for tracking partial or joint ownership of various products, as ownership rights, agreements, and entity statuses change over the course of time.

SUMMARY

In some embodiments of the present disclosure, an apparatus for use in a product information tracking system includes a storage device and a processor coupled to the storage device. The storage device includes stored software instructions for controlling the processor that when executed configure the processor to perform various operations, including: receiving a signal representing data including at least one of event information detailing an event involving a manufactured product and an event involving an entity having a registered ownership interest in the product; determining whether a triggering event corresponding to the event is stored in an event trigger list within a distributed electronic ledger for tracking information associated with the product, the event trigger list including entity data associated with each entity having a registered ownership interest in the product, and at least a portion of the distributed electronic ledger is stored at the storage device; when the event has a corresponding triggering event, determining a rule associated with the corresponding triggering event, wherein the rule is stored in a rules engine within the distributed electronic ledger; and updating and saving the distributed electronic ledger by performing an action specified by the determined rule. The product may be a connected product. The event trigger list may include product data associated with maintenance of the product or product data associated with performance of the product. The action may be a transaction corresponding to an automatic increase, decrease, or transfer to another entity, of an entity's registered ownership interest in the product.

In some embodiments of the present disclosure, an apparatus for use in a product ownership tracking system includes a storage device and a processor coupled to the storage device. The storage device includes stored software instructions for controlling the processor that when executed configure the processor to perform various operations, including: receiving a signal representing data including event information detailing an event involving an entity having a registered ownership interest in the product; loading a portion of a distributed electronic ledger for tracking ownership information associated with the product, the distributed electronic ledger including, within a block thereof and associated with the product, an event trigger list including entity data associated with each entity having a registered ownership interest in the product and a rules engine including at least one of rules associated with event triggers in the event trigger list, the rules defining ownership transfer terms, ownership interest allocation terms, and funds distribution terms, associated with the product; determining whether a triggering event corresponding to the event is stored in the event trigger list; when the event has a corresponding triggering event, determining the associated rule within the rules engine; and updating and saving the distributed electronic ledger by performing an action specified by the determined associated rule. The product may be a connected device and at least a part of the event information may be obtained from the product when in a connected state. The action may be processing the transfer of an entity's registered ownership interest in the product to another entity.

In various embodiments of the present disclosure, a computer-implemented process includes receiving with a processor a signal representing data including event information detailing an event involving at least one of plural entities each having a respective registered ownership interest in the product and loading with the processor a portion of a distributed electronic ledger for tracking ownership information associated with the product. The distributed electronic ledger may include, within a block thereof and associated with the product, an event trigger list including entity data associated with each of the plural entities and a rules engine including rules associated with event triggers in the event trigger list. In various embodiments, the computer-implemented process also includes determining with the processor that a triggering event corresponding to the event is stored in the event trigger list, identifying with the processor a rule associated with the corresponding triggering event, wherein the rule is stored in a rules engine within the distributed electronic ledger; and executing the identified rule with the processor by updating and saving the distributed electronic ledger and performing an action specified by the identified rule. The action may be processing the transfer of the at least one of the plural entities' registered ownership interest in the product to another entity.

BRIEF DESCRIPTION OF THE DRAWINGS

The following will be apparent from elements of the figures, which are provided for illustrative purposes and are not necessarily to scale.

DETAILED DESCRIPTION

This description of the exemplary embodiments is intended to be read in connection with the accompanying drawings, which are to be considered part of the entire written description. The use of the singular includes the plural unless specifically stated otherwise. The use of "or" means "and/or" unless stated otherwise. Furthermore, the use of the term "including," as well as other forms such as "includes" and "included," is not limiting. In addition, terms such as "element" or "component" encompass both elements and components comprising one unit, and elements and components that comprise more than one subunit, unless specifically stated otherwise. Additionally, the section headings used herein are for organizational purposes only, and are not to be construed as limiting the subject matter described.

Figure 1:
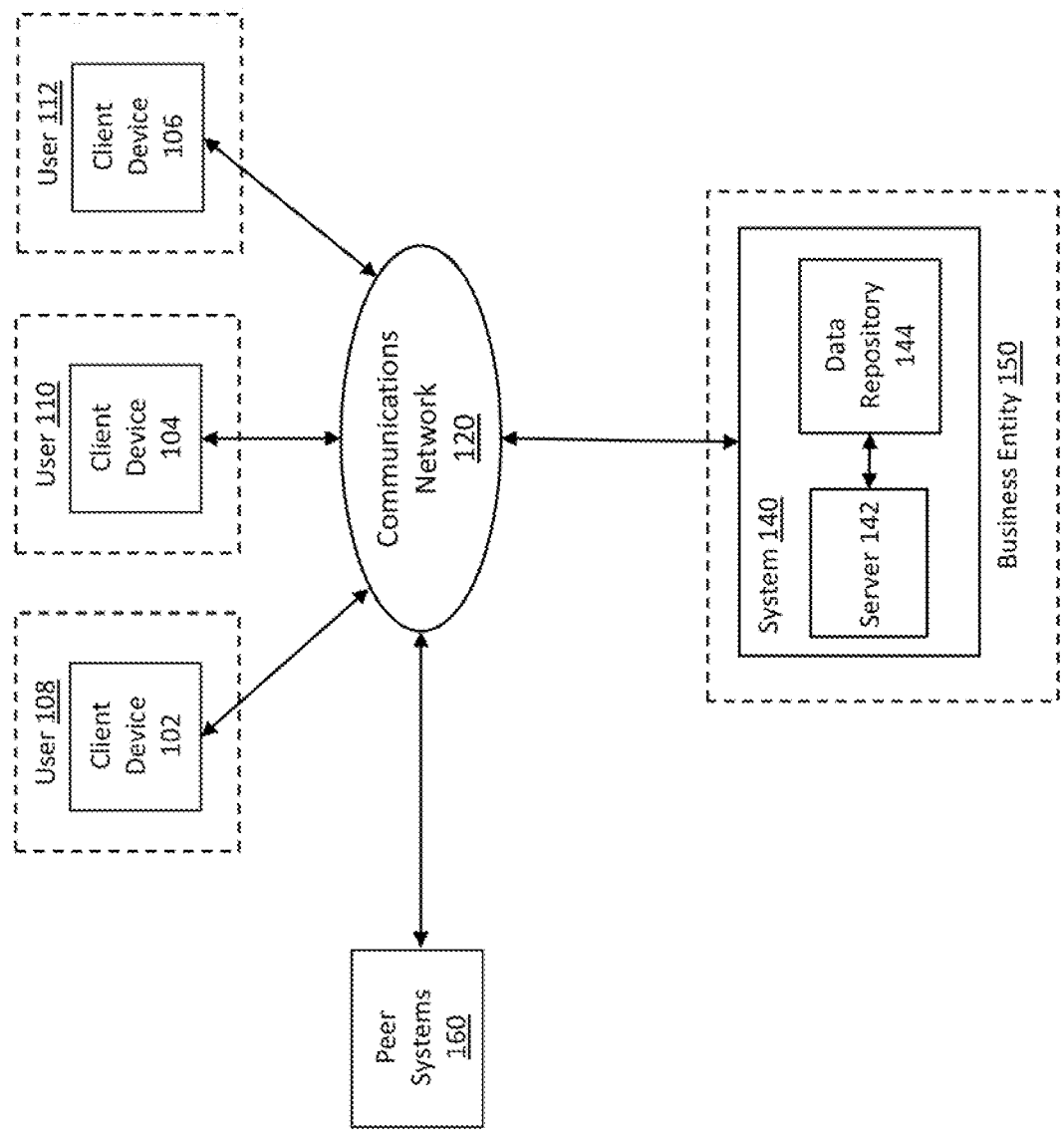
FIG. 1 is a diagram of a system in accordance with some embodiments of the present disclosure.

FIG. 1 is a block diagram of a system 100 in accordance with some embodiments of the present disclosure. System 100 may be a computing environment including client devices 102, 104, and 106, system 140, one or more peer systems 160, and a communications network 120 connecting various components of system 100. Although three client devices are shown in this example, any number of client devices may be present.

Various components of computing environment 100 are configured to address problems associated with conventional block-chain-based ledgers by embedding a master encryption key architecture into a conventional block-chain architecture (e.g., a block-chain-based architecture associated with the public Bitcoin™ ledger). In various embodiments, the resulting hybrid public-private block-chain architecture facilitates selective encryption of information by client devices 102, 104, and 106, system 140, and/or peer systems 160, thus providing a solution that protects sensitive and/or confidential instructions.

The conventional block-chain architecture is described below with reference to FIG. 2, and then distributed electronic ledger (e.g. hybrid public-private block-chain) architectures in accordance with various embodiments are described.

Asset Tracking Using Conventional Block-Chain Ledgers

Figure 2:
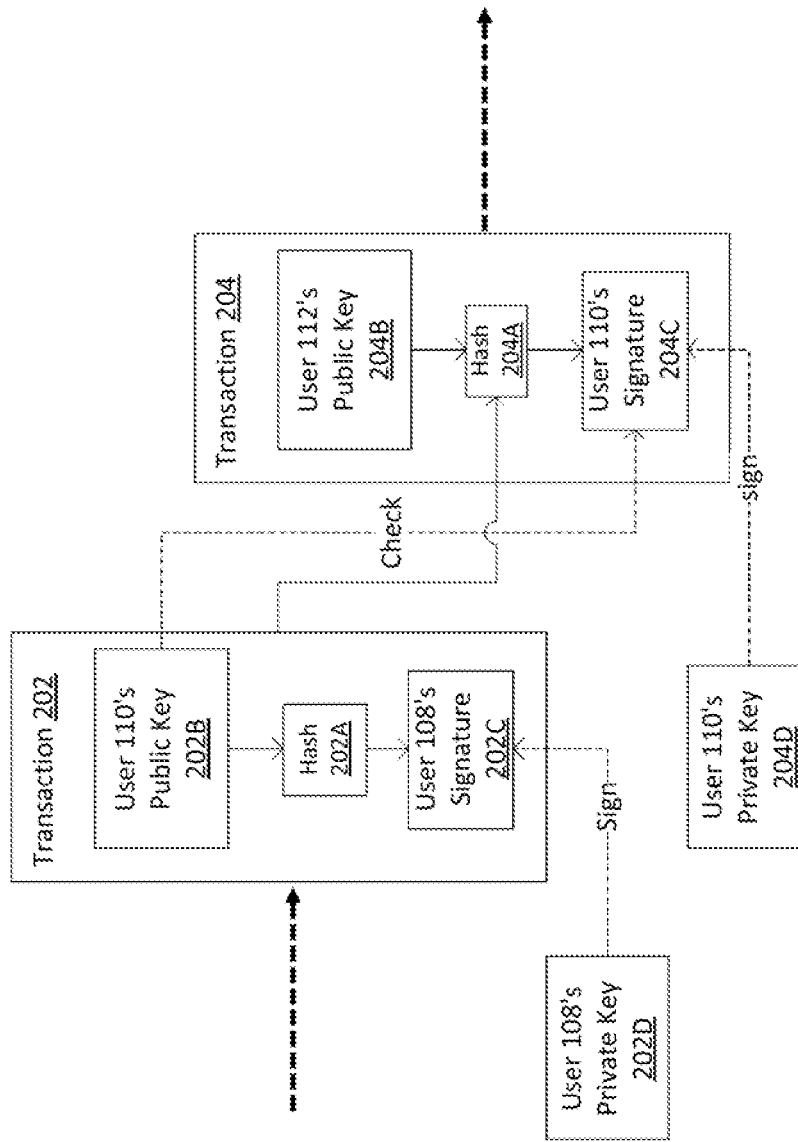
FIG. 2 is a diagram of a conventional block-chain ledger architecture.

FIG. 2 is a diagram of a structure 200 of a conventional block-chain ledger, which may be generated through the interaction of components of computing environment 100. In the example of FIG. 2, user 110 is associated with client device 104, which executes a stored software application (e.g., a wallet application) capable of obtaining a current version of a conventional block-chain ledger from one or more networked computer systems (e.g., one of peer systems 160 configured to "mine" broadcasted transaction data and update ledgers). The current version of a conventional block-chain ledger may represent a "longest" block-chain ledger that includes a maximum number of discrete "blocks." The blocks identify respective transactions that transfer and/or distribute portions of tracked assets among various owners, including user 110.

FIG. 2 shows blocks corresponding to two transactions 202 and 204, with arrows to the left and right of these transactions indicating that these are merely two transactions in a potentially longer series of chained blocks (hence the term "block-chain ledger"). In the first transaction (transaction 202) depicted in FIG. 2, user 108 transfers ownership of a portion of tracked assets (e.g., of some amount of a virtual currency or cryptocurrency) to user 110. In the second transaction (transaction 204), user 110 transfers ownership to user 112. In general, any number of transactions may be supported.

Client device 104 obtains the current block-chain ledger and processes the block-chain ledger to determine that a prior owner (user 108 in this example) transferred ownership of a portion of the tracked assets to user 110 in transaction 202. One or more peer systems 160 previously verified, processed, and packed data associated with transaction 202 into a corresponding block of the conventional block-chain.

Transaction 202 includes a cryptographic hash (e.g., hash 202A) of one or more prior transactions, and a public key of the recipient (e.g., public key 202B of user 110). The transaction data may also include a digital signature 202C of user 108 (the prior owner), which is applied to hash 202A and public key 202B using a private key 202D of user 108 through any of a number of techniques apparent to one of skill in the art. The presence of user 108's public key within transaction data included within the conventional block-chain ledger facilitates verification of user 108's digital signature 202C by client device 104 and/or peer systems 160.

In the second transaction (transaction 204), user 110 transfers the tracked asset portion to user 112. For example, client device 104 may execute one or more software applications (e.g., wallet applications) that generate data specifying a transaction (e.g., transaction 204) transferring ownership of the tracked asset portion from user 110 to user 112, and further. The software application(s) transmit the generated data to one or more of peer systems 160 for verification, processing (e.g., additional cryptographic hashing) and inclusion into a new block of the block-chain ledger.

For example, data specifying transaction 204 may include a cryptographic hash 204A of prior transaction 202, a quantity or number of units of the tracked asset portion that are subject to transfer in transaction 204, and a public key of the recipient (e.g., public key 204B of user 112). Further, in some aspects, the data specifying transaction 204 may include a digital signature 204C of the user 110, which may be applied to hash 204A and public key 204B using a private key 204D of user 110. Further, and by way of example, the presence of user 110's public key 202B within transaction data included within the conventional block-chain ledger may enable various devices and systems (e.g., client devices 106, 106, and/or 108, peer systems 160, etc.) to verify user 110's digital signature 204C, as applied to data specifying transaction 204.

One or more of peer systems 160 may receive the data specifying transaction 204 from client device 104. In certain instances, peer systems 160 may act as "miners" for the block-chain ledger, and may competitively process the received transaction data (either alone or in conjunction with other data) to generate additional blocks of the ledger, which may be appended to the block-chain ledger and distributed across peer systems 160 (e.g., through a peer-to-peer network) and to other connected devices of environment 100.

Conventional block-chain ledger architectures enable the public to review content of the ledgers and verify ownership details. The decentralized nature of conventional block-chain ledgers enables multiple distributed networks to verify the contents of a single ledger. The resulting redundancy may render the conventional block-chain ledger architecture more robust than centralized server systems, and effectively eliminates the falsification of ledger data by malicious parties.

Despite these positive characteristics, conventional block-chain ledger architectures have certain drawbacks when implemented by secured, high-risk systems. For example, unencrypted conventional ledger blocks may represent a security concern for transactions of sensitive nature and may represent a privacy concern for members of the general public. For instance, information indicative of an interaction of a prior asset owner and a corresponding device, as present within conventional block-chain ledgers, may represent private information that should not be available to future owners, let alone members of the public.

Furthermore, if an owner loses his/her private key, the distributed nature of conventional block-chain ledger architectures provides little or no opportunity to recover possession of the tracked asset(s). The rigidity and inflexibility of these conventional block-chain ledger architectures, and their inability to adapt to changing circumstances (e.g., loss of private keys, theft of tracked assets due to fraudulent or malicious activity), often results in volatility in the usage of the tracked assets and an erosion in the public's trust of conventional block-chain ledgers.

Various embodiments address the foregoing deficiencies of conventional block-chain ledger architectures by providing security features suitable for use in high-risk, sensitive scenarios. Furthermore, various embodiments provide a framework that gives recourse to owners or holders of assets tracked by distributed electronic ledger (e.g. block-chain ledger) architectures in the event of fraud or malicious activity, while maintaining the public availability and verification characteristics of block-chain ledgers.

Client Devices

Referring back to FIG. 1, each of client devices 102, 104, and 106 may include a computing device, such as a hashing computer, a personal computer, a laptop computer, a tablet computer, a notebook computer, a hand-held computer, a personal digital assistant, a portable navigation device, a mobile phone, a smart phone, a wearable computing device (e.g., a smart watch, a wearable activity monitor, wearable smart jewelry, and glasses and other optical devices that include optical head-mounted displays (OHMDs), an embedded computing device (e.g., in communication with a smart textile or electronic fabric), and any other type of computing device that may be configured to store data and software instructions, execute software instructions to perform operations, and/or display information on a display device. At least one of client devices 102, 104, and 106 may be associated with one or more users, such as users 108, 110, and 112, as shown in FIG. 1. For example, user 110 operates client device 104 and causes it to perform one or more operations in accordance with various embodiments.

Each client device 102, 104, 106 includes one or more tangible, non-transitory memories that store data and/or software instructions, and one or more processors configured to execute software instructions. Client devices 102, 104, and 106 may include one or more display devices that display information to a user and one or more input devices (e.g., keypad, keyboard, touchscreen, voice activated control technologies, or any other type of known input device) to allow the user to input information to the client device.

In one aspect, each client device 102, 104, and 106 stores in memory one or more software applications that run on the client device and are executed by the one or more processors. In some instances, each client device stores software applications that, when executed by one or more processors, perform operations that establish communications with one or more of peer systems 160 (e.g., across network 120) and that obtain, from peer systems 160, a current version of a distributed electronic ledger (e.g. hybrid block-chain ledger) generated and maintained in accordance with various embodiments.

Each client device 102, 104, and 106 may execute the stored software application(s) to obtain data from the distributed electronic ledger (e.g. hybrid block-chain ledger) that includes data identifying one or more tracked assets, and/or a public key of one or more users. The executed software applications may cause client devices 102, 104, and 106 to extract, from one or more accessed transaction blocks of the distributed electronic ledger, a copy of an encrypted and/or hashed ownership/rules portion of the transaction block(s) (e.g., including the identification of a holder of a master key) and/or a copy of an encrypted and/or hashed master data block (e.g., encrypted using the master key and including rules permitting preconfigured and/or permissible actions involving the tracked assets). Client devices 102, 104, and 106 may provide information associated with one or more actions or transactions involving the tracked assets (e.g., information identifying the actions or transaction, information identifying the assets, a public key, a digital signature, etc.) to peer systems 160, along with copies of the encrypted and/or hashed rules engines and lists of triggering events.

In some embodiments, the stored application(s) include a wallet application provided by business entity 150 (e.g., a mobile wallet application or an application executable on a desktop computer). The wallet application is capable of initiating transactions denominated in one or more currencies, including virtual currencies such as Bitcoin™.

Exemplary Computer Systems

System 140 may be a computing system configured to execute software instructions to perform one or more operations in accordance with various embodiments. In one aspect, system 140 is be associated with a business entity 150 (e.g., a financial institution) that provides financial accounts, financial services transactions, and investment services to one or more users (e.g., customers of business entity 150). In some aspects, system 140 is a distributed system that includes computing components distributed across one or more networks, e.g., network 120.

In one aspect, system 140 includes computing components configured to store, maintain, and generate data and software instructions. For example, system 140 may include one or more servers (e.g., server 142) and tangible, non-transitory memory devices (e.g., data repository 144). Server 142 may include one or more computing devices configured to execute software instructions to perform one or more processes in accordance with various embodiments. In one example, server 142 is a computing device that executes software instructions to perform operations that provide information to at least one other component of computing environment 100.

In one embodiment, server 142 includes a computer (e.g., a personal computer, network computer, or mainframe computer) having one or more processors that are selectively activated or reconfigured by a computer program. In one aspect, server 142 (or other computing components of system 140) may be configured to provide one or more websites, digital portals, etc., that provide services consistent with business entity 150, such as a digital banking or investment portal. For instance, server 142 may be configured to provide information associated with a requested web page over communications network 120 to client device 104, which may render the received information and present content from the web page on a display device, e.g., a touchscreen display unit.

In other aspects, server 142 (or other computing components of system 140) may be configured to provide information to one or more application programs executed by client device 104, e.g., through a corresponding application programming interface (API). For example, client device 104 may execute an application program associated with and provided by business entity 150, such a mobile banking application and/or a mobile wallet application, to provide services in accordance with various embodiments. In some instances, server 142 provides information to client devices 102, 104, and/or 106 (e.g., through the API associated with the executed application program), and client devices 102, 104, and/or 106 present portions of the information to corresponding users through a corresponding graphical user interface (GUI).

Server 142 (or other computing components of system 140) may be configured to provide to client devices 102, 104, and/or 106 (and/or receive from any of the client devices) information associated with services provided by business entity 150. For example, client device 104 may receive the transmitted information, and store portions of the information in locally accessible storage device and/or network-accessible storage devices and data repositories (e.g., cloud-based storage). In one instance, client device 104 executes stored instructions (e.g., an application program, a web browser, a mobile banking application, and/or a mobile wallet application) to process portions of the stored data and render portions of the stored data for presentation to user 110. Additionally, server 142 may be incorporated as a corresponding node in a distributed network or as a corresponding networked server in a cloud-computing environment. Furthermore, server 142 may communicate via network 120 with one or more additional servers (not shown), which may facilitate the distribution of processes for parallel execution by the additional servers.

In further aspects, business entity 150 may represent a "controlling entity" capable of regulating transaction assets (e.g., units of virtual currency, units of various financial instruments, businesses (e.g. company, corporation, LLC, etc.), physical assets, including tangible products, such as manufactured products, etc.) tracked within distributed electronic ledgers (e.g. hybrid public-private ledgers) in accordance with various embodiments. For example, one or more computing components of system 140 (e.g., server 142) may be configured (e.g., by executed software instructions) to establish one or more rules that regulate distributions of and/or transactions associated with the tracked assets, an initiation of transfers of the tracked assets (e.g., a sale, a use of the tracked assets as collateral in a secured transaction etc.), and any other action involving the tracked assets and/or the hybrid public-private ledger (e.g., processes that generate additional cryptographic key sets for user 110, processes that recover assets tracked in the hybrid public-private ledger, etc.).

System 140 may establish causal relationships between one or more of the established rules and one or more events that trigger an initiation of one or more corresponding regulated distributions, transfers, and/or other actions involving assets tracked within the hybrid public-private ledger (e.g., "triggering events"). For example, a confirmed loss of a private cryptographic key issued to user 110 may represent a triggering event that causes system 140 to verify user 110's identity, initiate a transaction of the orphaned assets, generate a new pair of public and private cryptographic keys for user 110 (i.e., public and private block-chain keys), and transmit at least the private block-chain key to user 110 through secure, non-accessible processes (e.g., by mail), in accordance with one or more of the established rules.

A theft of a portion of user 110's tracked assets (e.g., unauthorized usage of the asset by an unidentified third party) may represent a triggering event. This triggering event causes system 140 to initiate a recovery protocol to generate a transaction request to recover the value of the stolen assets (e.g., to transfer the stolen assets back to user 110), and also causes system 140 to generate a new pair of public and private block-chain keys for user 110. In other instances, a death and/or incapacitation of user 110 may represent a triggering event that causes system 140 to initiate a series of transaction to distribute at least a portion of the tracked assets (e.g., through corresponding transaction requests) to one or more additional owners identified by user 110 and specified within corresponding ones of the identified rules.

In some aspects, system 140 is configured to establish one or more of the rules, and one or more of the causal relationships and triggering events, based on internal regulations associated with business entity 150. For example, the internal regulations associated with business entity 150 may specify that system 140 verify an identity of user 110 (e.g., based on various forms of multi-factor authentication data) and/or obtain specific elements of documentation (e.g., a police report, etc.) prior to initiating the lost private key protocol and/or recovery protocols outlined above. In other aspects, system 140 may establish one or more of the rules and/or triggering events based on information received from user 110 (e.g., as input provided to a web page or other graphical user interface (GUI) presented by client device 104 and provided to system 140). For example, user 110 may specify, as input to the web page or GUI presented by client device 104, one or more individuals that would receive portions of the tracked assets upon completion of one or more tasks and/or in the event of user 110's accidental death. Various embodiments are, however, not limited to the exemplary triggering events and established rules described above, and in other aspects, various embodiments may be configured to generate any other user- and system-specified rules and triggering events consistent with the distributed electronic ledger (e.g. hybrid public-private ledger) and appropriate to the tracked assets, user 110, and/or business entity 150 (acting as a centralized authority for the distributed electronic ledger).

In embodiments where the distributed electronic ledger (e.g. hybrid block-chain ledger) is used in tracking ownership information of products, such as manufactured goods, rules may govern, for example, the allocation of ownership interest in the product between joint owner entities, the increase, decrease, or transfer of such ownership interest, and funds distribution between joint owner entities, in the product's life cycle subsequent to such entities acquiring a respective ownership interest therein. Triggering events along the product's life cycle may include, by way of example only, sale of the product to joint owner entities, change in the vital status (e.g. death, incapacitation) of an owner entity, change in the marital status (e.g. married, divorced) of one or more owner entities, payment contributions of an owner entity, reallocation or transfer of an owner entity's ownership interest in the product, modification of a rule or term associated with the product, and the use of the product (e.g., in the case of a connected device). Actions or operations specified and performed based on application of a rule to an event may include, without limitation, registering an ownership interest in a product, increasing or decreasing an ownership interest in a product, approving or declining a transfer of an ownership interest in a product, transferring an ownership interest in a product to another entity, and disbursing funds related to the event and pertaining to the product.

In embodiments where the distributed electronic ledger (e.g. hybrid block-chain ledger) is used in tracking real-time information about connected device products, such as manufactured goods, rules may govern, for example, the value, maintenance, or performance of the product. Triggering events along the connected device product's life cycle may include, by way of example only, use of the product, location of the product, maintenance status of the product, maintenance milestones of the product, and performance thresholds of the product. Actions or operations specified and performed based on application of a rule to an event may include, without limitation, appreciating or depreciating the value of the product, and communicating a notification to be displayed on a user interface (e.g. GUI) of the product.

System 140 may be configured to store the one or more established rules (e.g., as a rules engine or rules section) and one or more of the established trigger events (e.g., as an event trigger list) within a portion of a local data repository (e.g., data repository 144). System 140 may be configured to store portions of the rules engine and/or event trigger list within a secure data repository accessible to system 140 across network 140 (e.g., cloud-based storage).

One or more computing components of system 140 (e.g., server 142) may be configured to generate pairs of public and private block-chain keys for user 110 (e.g., user 110's public/private block-chain key pair), and to provide the generated private block-chain key to user 110 through secure, non-accessible and/or out-of-band communications (e.g., by mail, etc.). In further embodiments, the one or more components of system 140 (e.g., server 142) may be configured to generate and maintain additional cryptographic keys that facilitate a generation and maintenance of portions of the distributed electronic ledger (e.g. hybrid public-private ledger). For instance, system 140 may be configured to generate a master key, which system 140 may leverage to encrypt the stored rules engine. System 140 may store copies of the generated master key in a portion of data repository 144 that is not accessible to user 110 (and any other users), thus maintaining a confidence of the generated master key.

System 140 may be configured to generate and maintain a private crypto key on behalf of user 110 (and users 108 and 112), which system 140 may leverage to encrypt the stored event trigger list, and which may be provided to user 110 (and/or to users 108, 112) through secure, non-accessible and/or out-of-band communications. System 140 may store copies of the private crypto keys in a portion of data repository 144.

In some embodiments, one or more computing components of system 140 (e.g., server 140) is configured to hash the generated (and encrypted) rules engine and event trigger list into a genesis block associated with the distributed electronic ledger (e.g. hybrid public-private ledger). System 140 may provide the encrypted rules engine and event triggers list to one or more of peer systems 160, which may be configured to hash the encrypted rules engine and event trigger list into the genesis block. By hashing the encrypted rules engine and event trigger list into the genesis block of the distributed electronic ledger (e.g. hybrid public-private ledger), various embodiments enable an in-band communication of the encrypted rules engine and event triggers from user to user within blocks (e.g., transactions) of the distributed electronic ledger.

Exemplary Data Repositories and Stored Data

Data repository 144 may include one or more memories that are configured to store and provide access to data and/or software instructions. Such memories may include tangible non-transitory computer-readable media that store software instructions that, when executed by one or more processors (e.g., of server 132), perform one or more operations in accordance with various embodiments. Data repository 144 may also be configured to store information relating to business entity 150, e.g., a financial institution.

For instance, data repository 144 may store customer data that uniquely identifies customers of a financial institution associated with system 140. As one example, a customer of the financial institution (e.g., any of users 108, 110, and 112) may access a web page associated with system 140 (e.g., through a web server executed by a corresponding front end), and may register for digital banking services and provide data, which may be linked to corresponding ones of users 108, 110, and/or 112, and stored as customer data within data repository 144. The stored customer data may, for example, include personal information, government-issued identifiers, employment information, and contact information. The stored customer data may also include authentication credentials associated with registered users of the financial institution, e.g., a user name, a user-specified password, a system-generated password, an alphanumeric identification number (e.g., a PIN number) specified by the users or assigned by financial system 140, biometric information, and information facilitating enhanced authentication techniques.

Data repository 144 may store a rules engine identifying one or more rules that regulate a distribution of the tracked assets, an initiation of one or more transactions involving the tracked assets (e.g., a sale, a transfer in ownership, a use of the tracked assets as collateral in a secured transaction etc.), and any other action involving the tracked assets and/or the distributed electronic ledger (e.g. hybrid public-private ledger) (e.g., processes that generate additional cryptographic key sets for users 108, 110, and/or 112, processes that recover assets tracked in the hybrid public-private ledger, etc.). Data repository 144 may also store information identifying an event triggers list that identifies causal relationships established by system 140 between one or more of the established rules and one or more events that trigger an initiation of one or more corresponding regulated distributions, transactions, and/or assets tracked within the distributed electronic ledger (e.g. hybrid block-chain ledger) (e.g., "triggering events").

In some aspects, system 140 is configured to establish one or more of the rules, and one or more of the causal relationships and triggering events, based on one or more internal regulations associated with business entity 150. In other aspects, system 140 may establish one or more of the rules and/or triggering events based on information received from one or more of users 108, 110, and/or 112, e.g., as input provided to a web page or other graphical user interface (GUI) presented by client devices 102, 104, and/or 106 and provided to system 140.

Data repository 144 may also store a copy of a master key, private crypto keys associated with users 108, 110, and 112, and additional private crypto keys associated with other users. For example, system 140 may be configured to store the private crypto keys in a data structure that includes information that associates the private crypto keys with corresponding users 108, 110, and 112, and further, may be configured to store the master key in a data structure within data repository 144 that is inaccessible to users 108, 110, and/or 112 (and other users). Further, in some aspects, data repository 144 may be configured to store the rules engine and/or event triggers list in raw, unencrypted form. In other aspects, in accordance with various embodiments, data repository 144 may be configured to store the rules engine and/or event triggers in encrypted form (e.g., using the stored master key), and/or store a hashed representation of the rules engine and/or the event triggers list.

Exemplary Communications Networks

Communications network 120 may include one or more communication networks or media of digital data communication. Examples of communication network 120 include a local area network ("LAN"), a wireless LAN, a RF network, a Near Field Communication (NFC) network, (e.g., a "WiFi" network), a wireless Metropolitan Area Network (MAN) connecting multiple wireless LANs, NFC communication link(s), and a wide area network ("WAN"), e.g., the Internet. In accordance with various embodiments of the present disclosure, communications network 120 may include the Internet and any publicly accessible network or networks interconnected via one or more communication protocols, including, but not limited to, hypertext transfer protocol (HTTP) and transmission control protocol/internet protocol (TCP/IP). Communications protocols in accordance with various embodiments also include protocols facilitating data transfer using radio frequency identification (RFID) communications and/or NFC. Moreover, communications network 120 may also include one or more mobile device networks, such as a GSM network or a PCS network, allowing client device 104 to send and receive data via applicable communications protocols, including those described herein.

Exemplary Peer Systems

Referring back to FIG. 1, peer systems 160 may include one or more computing systems configured to execute software instructions to perform one or more operations in accordance with various embodiments. In some aspects, peer systems 160 may include computing components configured to store, maintain, and generate data and software instructions. For example, each of peer systems 160 may include one or more computing devices (e.g., a server, network computer, or mainframe computer) having one or more processors that may be selectively activated or reconfigured by executable instructions (e.g., computer programs) stored in one or more tangible, non-transitory computer-readable storage devices.

In an embodiment, one or more of peer systems 160 may be configured to receive, from client device 104 across network 120, information associated with a distribution of, transaction involving, or other action associated with one or more assets tracked within hybrid block-chain ledgers in accordance with various embodiments. For example, the received information may include, but is not limited to, data identifying at least a portion of the tracked assets, data identifying a current owner of the portion of the tracked assets (e.g., user 110) (or an obfuscated owner identifier), and further, encrypted copies of and/or hash values representative of the rules engine and event triggers list.

In some aspects, one or more of peer systems 160 are configured (e.g., by the executed software programs) to validate the received information and to generate a new block of the distributed electronic ledger (e.g. hybrid block-chain ledger) that includes the received information, either alone (e.g., using a "one transaction, one block" paradigm) or in combination with information identifying additional distributions, transactions, or other actions associated with one or more tracked assets (e.g., as a multiple-transaction block). The one or more peer systems 160 may be further configured to generate one or more hashes representative of the new block, which may be appended to a prior version of the distributed electronic ledger (e.g. hybrid private-public ledger) along with the newly generated block. In some aspects, the one or more peer systems 160 may maintain the updated versions of the distributed electronic ledger (i.e., the latest, longest distributed electronic ledger), and may provide the updated version of the distributed electronic ledger to client devices 102, 104, and/or 106 (or other client devices associated with other users) upon receipt of a request across network 120 and/or at regular or predetermined intervals.

In certain instances, and in addition to a connection with network 120, peer systems 160 may be interconnected across a peer-to-peer network (not depicted in FIG. 1) using any of the wired or wireless communications protocols outlined above. Further, in some instances, one or more of peer systems 160 may function as a "miner," where any miner may be compensated in units of a virtual currency (e.g., Bitcoin™) for validating the received data and for generating updated versions of the distributed electronic ledger (e.g. hybrid block-chain ledger).

Exemplary Processes for Tracking Assets Using Hybrid Private-Public Ledgers

In some embodiments, client devices 102, 104, and/or 106 may execute one or more stored applications that enable corresponding users to track, in conjunction with peer systems 150 and other components of computing environment 100, a disposition and distribution of one or more assets using conventional, publicly available and transparent block-chain ledgers. In some aspects, the use of public block-chain ledgers to track ownership, disposition, and distribution of actual and/or virtual assets (e.g., unit of virtual currencies, such as Bitcoin™, unit of other financial instruments and securities, physical assets, etc.) may present advantages over existing centralized server systems, such as those provided by financial institutions that leverage private ledgers.

Exemplary Hybrid Public-Private Block-Chain Ledger Architectures

Various embodiments address problems associated with conventional block-ledger architectures in a technical manner, by providing computer-implemented systems and methods that augment a conventional block-chain ledger with a private-master encryption key architecture that, in conjunction with an owner's pair of public and private block-chain keys, selectively encrypt ledger data to protect both the privacy of owners of tracked assets and the confidentiality of existing instruction sets maintained within the block-chain ledger.

By incorporating an encrypted rules engine and corresponding list of triggering events (e.g., an event triggers list)

into each block of the conventional block-chain ledger architecture (and thus generating a hybrid, public-private block-chain architecture), computer-implemented systems and methods in accordance with various embodiments may perform operations that provide owners or holders tracked assets with recovery options in an event of fraud or malicious activity, while maintaining the public availability and verification characteristic of conventional block-chain ledgers.

Discrete data blocks of the conventional block-chain ledgers (e.g., as outlined above in reference to FIG. 2) and of the hybrid block-chain ledgers (e.g., as described in reference to FIG. 3) may include common elements of data that may specify transactions that distribute, transfer, and/or otherwise act upon portions of tracked assets. For example, these common data elements may include, but are not limited to, input data that references one or more prior transactions (e.g., a cryptographic hash of the one or more prior transactions), output data that includes instructions for transferring the tracked asset portion to one or more additional owners (e.g., a quantity or number of units of the tracked asset portion that are subject to the transaction and a public key of the recipient), and a digital signature applied to the input and/or output data using a corresponding private key of a current owner of the tracked asset portion. Various embodiments are, however, not limited to exemplary transactions that include a transfer of tracked assets and to the exemplary data elements described above, and in further embodiments, discrete blocks of the hybrid block-chain ledgers may represent any other transaction appropriate to the tracked assets and any other data appropriate to the tracked assets and to the transaction.

In contrast to conventional block-chain ledgers, various embodiments may establish a "centralized authority" capable of vetting real-time transactions (e.g., distributions, transfers, and/or other actions) involving portions of assets tracked within the exemplary hybrid block-chain ledger architectures described herein, and capable of establishing and maintaining rules (e.g., through a rules engine and corresponding list of triggering events) that facilitate regulatory-based, policy-based, and customer-specified controls of transactions involving the tracked assets (e.g., units of virtual currency, etc.).

For example, business entity 150 may represent the centralized authority, and one or more computing components of system 150 may perform operations that establish the rules engine and the list of triggering events, which may be stored within a secure data repository (e.g., data repository 144). In some aspects, the generated and stored rules engine may identify one or more rules that regulate a distribution of the tracked assets, an initiation of one or more transactions involving the tracked assets (e.g., a sale, a use of the tracked assets as collateral in a secured transaction etc.), and further, any other action involving the tracked assets and/or the hybrid public-private ledger (e.g., processes that generate additional cryptographic key sets for user 110, processes that recover assets racked in the hybrid public-private ledger, etc.). The generated and stored list of triggering events may include information that specifies causal relationships between one or more of the established rules and one or more events that trigger an initiation of one or more corresponding regulated distributions, transactions, and/or actions associated with assets tracked within the hybrid public-private ledger (e.g., the triggering events).

System 140 may establish one or more of the rules and/or triggering events to reflect regulations and/or policies promulgated by a governmental entity, a financial regulator, and/or the centralized authority. For example, system 140 may establish a loss of a private key by user 110 as a "triggering event" that would cause system 140 to perform operations that create a new transaction and generate a new pair of public and private block-chain keys for user 110 in response to a verification of particular authentication credentials. In other aspects, system 140 may establish one or more of the rules and/or triggering events based on information received from user 110 (e.g., as input provided to a web page or other graphical user interface (GUI) presented by client device 104 and provided to system 140). For example, user 110 may specify a particular distribution of tracked assets (e.g., recurring bill payments, distributions to other owners, etc.) in response to an accident that may occur in the future involving user 110 and/or user 110's death (e.g., triggering events).

In further contrast to conventional block-chain ledgers, one or more computing components of system 140 (e.g., server 142 upon execution of stored instructions) may generate additional cryptographic keys that facilitate the exemplary regulation of transactions (e.g., distributions, transfers, and/or actions) involving assets tracked within the hybrid public-private ledger. By way of example, system 140 may generate a master cryptographic key with which system 140 may encrypt the generated and stored rules engine. In some aspects, system 140 may store copies of the generated master key in a portion of data repository 144 that is not accessible to user 110 (and any other users), thus maintaining confidence in the generated master key.

System 140 may also perform operations that encrypt the generated list of triggering events, either alone or in conjunction with metadata identifying the centralized authority and/or information facilitating processing of the transaction blocks throughout the hybrid block-chain ledger. System 140 may also perform operations that generate and maintain additional private cryptographic keys (e.g., a private "crypto" key) associated with each owner and associated with the assets tracked within the hybrid block-chain ledger (e.g., users 108, 110, and/or 112). The private crypto keys enable the owners to decrypt and access the list of triggering events and the metadata identifying the centralized authority. System 140 may store copies of the generated private crypto keys in a portion of data repository 144. Furthermore, system 140 may also perform operations that provide corresponding ones of the private crypto keys to users 108, 110, and/or 112 through secure, inaccessible, and/or out-of-band communications.

Various embodiments may also be configured to communicate the encrypted and/or hashed rules engine and list of triggering events to owners of, and/or user associated with, the tracked assets through "in-band" communication processes, such as through an incorporation of the encrypted rules engine and list of triggering events into the transaction blocks of the hybrid block-chain ledger. For example, system 140 may perform operations that hash the encrypted rules engine and list of triggering events into a genesis block of the hybrid block-chain ledger, the contents of which may be incorporated (e.g., by client devices 102, 104, and/or 106, peer systems 160, etc.) into each of the subsequent transaction blocks generated and appended to the hybrid block-chain ledger. In some aspects, by incorporating the hashed and encrypted rules engine and list of triggering events into blocks of the hybrid block-chain ledger, various embodiments may ensure that the established rules are followed even in an event of actions by malicious parties to disrupt the tracked assets (e.g., instances of Bitcoin™ peeling, etc.)

The additional private crypto keys held by the owners and/or users (e.g., stored in corresponding ones of client devices 102, 104, and/or 106 and accessible to executable application programs) may enable the owners and/or users to access the encrypted list of triggering events maintained within the hybrid block-chain ledger. The owners and/or user may, through corresponding client devices, view the individual events that, when detected by system 140, could cause system 140 to perform operations that recover, authorize, audit, and/or verify the transaction and/or ownership data included within the hybrid block-chain ledger (e.g., associated with corresponding portions of the tracked assets).

One or more computing components of system 140 may perform operations that modify portions of the stored rules and/or list of triggering events, e.g., in response to changes in regulations and/or policies, in response to additional owner input, etc. In order to access and modify the generated rules engine (and/or the list of triggering events) maintained within the hybrid block-chain ledger, system 140 may leverage the stored master cryptographic key to access and modify the hashed and encrypted rules engine. System 140 may encrypt and re-hash the modified rules engine and submit the encrypted and hashed modified rules engine to one or more of peer systems 160 for inclusion in a block of the hybrid block-chain ledger. For example, one or more of peer systems 160 may incorporate the hashed and encrypted modified rules engine into the hybrid block-chain ledger as a special transaction (e.g., a "0" value transaction), such that the hybrid block-chain ledger tracks each change within the modified rules engine.

Figure 3:
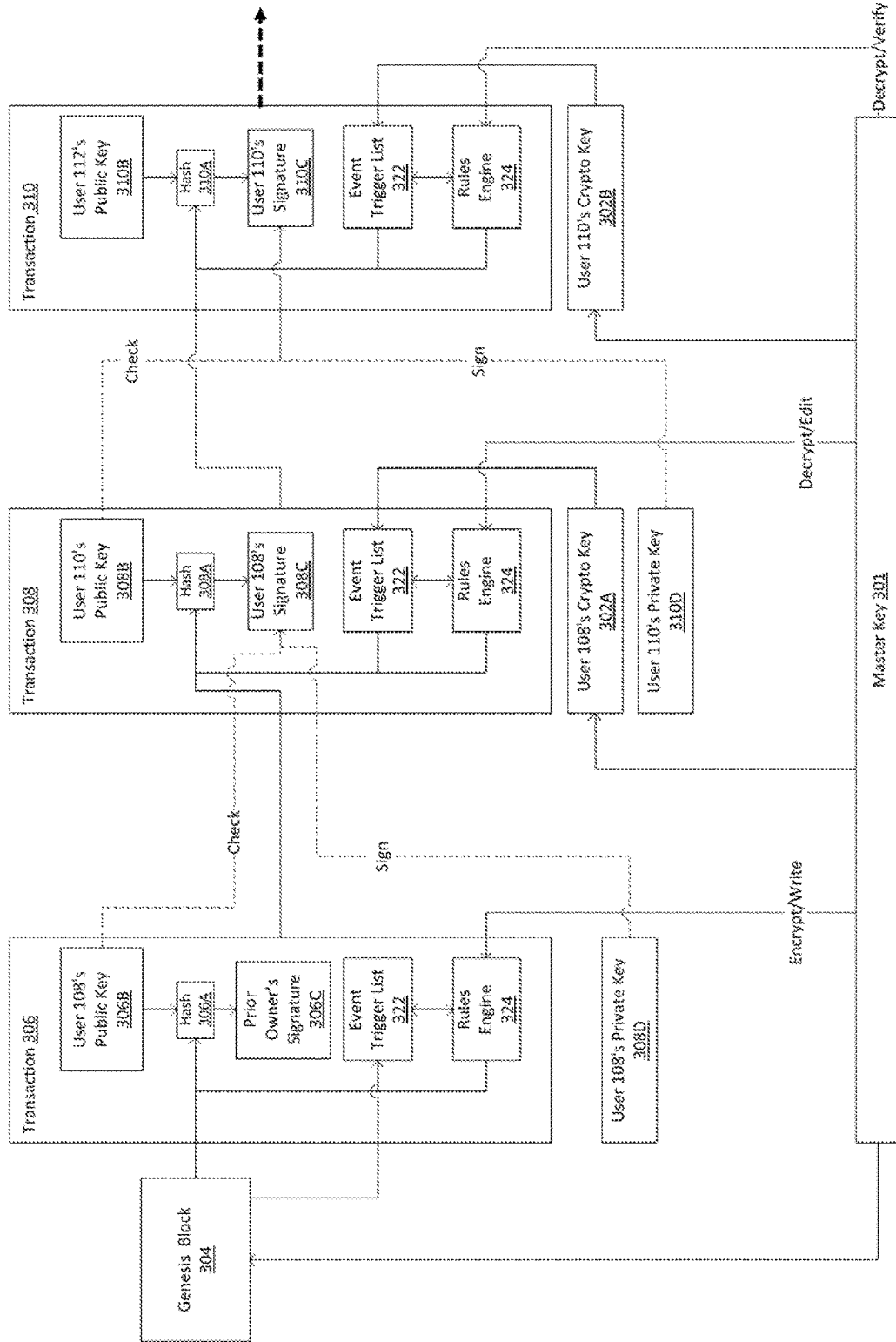
FIG. 3 is a diagram of a distributed public-private electronic ledger architecture in accordance with some embodiments.

FIG. 3 is a schematic diagram illustrating an exemplary structure 300 of a hybrid, public-private block-chain ledger, which may be generated through the interaction of components of computing environment 100 in accordance with various embodiments. For example, as described with reference to FIG. 3, users 108, 110, and 112 may be associated with corresponding devices (e.g., client devices 102, 104, and 106), which may be configured to execute one or more stored software applications (e.g., a wallet application) capable of obtaining a current version of a hybrid block-chain ledger from one or more networked computer systems (e.g., one of peer systems 160 configured to "mine" broadcast transactions and update ledgers).

A system associated with a centralized authority (e.g., system 140 associated with business entity 150) may generate a rules engine that regulates transactions involving the assets tracked by the hybrid block-chain ledger (e.g., distributions, transfers of ownership, other actions, etc.) and a list of triggering events that, upon detection by system 140, trigger an initiation of one or more of the distributions, transfers, and/or other actions regulated by the generated rules engine. System 140 may generate a master encryption key (e.g., master key 301 of FIG. 3), which may be maintained in a portion of data repository 144, and may generate additional private "crypto" keys 302A and 302B, which may be associated with corresponding ones of users 108 and 110 In some aspects, system 140 may maintain private crypto keys 302A, 302B, and 302C in a portion of data repository 144 and provide private crypto keys 302A, 302B, and 302C to users 108, 110, and 112 through secure, out-of-band communications. System 140 may encrypt the generated rules engine and the generated list of triggering events, and may perform operations that hash the encrypted rules engine and list of triggering events into a genesis block of the hybrid block-chain ledger (e.g., genesis block 304).

One of the users (e.g., user 108) may own and/or control a portion of the tracked assets. For example, a device associated with user 108 (e.g., client device 102) may execute a stored software application (e.g., a wallet application) capable of obtaining a current version of a hybrid block-chain ledger, including genesis block 304, from one or more networked computer systems (e.g., one of peer systems 160 configured to "mine" broadcast transactions and update ledgers). The current version of a hybrid block-chain ledger may represent a "longest" block-chain ledger than includes a maximum number of discrete "blocks," which may identify transactions that transfer, distribute, etc., portions of tracked assets among various owners, including user 108.

For example, client device 102 may obtain the current hybrid block-chain ledger and process the hybrid block-chain ledger to determine that a prior owner transferred ownership of a portion of the tracked assets to user 108 in a corresponding transaction (e.g., transaction 306, schematically illustrated in FIG. 3). One or more of peer systems 160 may have previously verified, processed, and packed data associated with transaction 306, which may be in a corresponding block of the block-chain.

As illustrated in FIG. 3, data specifying transaction 306 may include input data that references one or more prior transactions (e.g., transactions that transferred ownership of the tracked asset portion to the prior owner), and further, output data that includes instructions for transferring the tracked asset portion to user 108. For example, input data in accordance with various embodiments may include a cryptographic hash of the one or more prior transactions (e.g., hash 306A), and output data in accordance with various embodiments may include a quantity or number of units of the tracked asset portion that are subject to transfer in transaction 302 and a public key 306B of user 108 (i.e., the recipient of the tracked asset portion transferred in transaction 306). Further, in some aspects, the transaction data may include a digital signature 306C of the prior owner, which may be applied to hash 306A and public key 306B using a private key of the prior owner through any of a number of techniques apparent to one of skill in the art and appropriate to the block-chain ledger architecture.

Further, and in contrast to the conventional block-chain ledger architectures described above, transaction 306 may also include encrypted and/or hashed copies of rules engine 320 and trigger event list 322. A device of the prior owner (e.g., which may execute one or more software applications) may access genesis block 304 (e.g., from the current version of the hybrid block-chain ledger obtained from one or more of peer systems 160), may parse genesis block 304, and may extract copies of the encrypted and/or hashed rules engine 324 and trigger event list 322. The prior owner's device may transmit to one or more of peer systems 160 the hash 306A, public key 306B, and digital signature 306C for verification, processing (e.g., additional cryptographic hashing) and inclusion into a new block of the hybrid block-chain ledger. In an embodiment, user 108 may elect to further transfer that tracked asset portion to an additional user (e.g., user 110). For example, the one or more software applications executed by client device 102 may cause client device 102 to perform operations that generate input and output data specifying a new transaction (e.g., transaction 308 of FIG. 3) that transfers ownership of the tracked asset portion from user 108 to user 110, and further, that transmit the generated data to one or more of peer systems 160 for verification, processing (e.g., additional cryptographic hashing) and inclusion into a new block of the hybrid block-chain ledger.

For example, data specifying transaction 308 may include a cryptographic hash 308A of prior transaction 306, a quantity or number of units of the tracked asset portion that are subject to transfer in transaction 308, and a public key of the recipient (e.g., public key 308B of user 110). The data specifying transaction 308 may include a digital signature 308C of the user 108, which may be applied to hash 308A and public key 308B using a private key 308D of user 108. The presence of user 108's public key within transaction data included within the conventional block-chain ledger may enable various devices and systems (e.g., client devices 102, 104, and/or 106, peer systems 160, etc.) to verify user 108's digital signature 308C, as applied to data specifying transaction 308.

Client device 102 may also parse data specifying prior transaction 306 (e.g., as obtained from the current version of the hybrid block-chain ledger) and extract encrypted and/or hashed copies of rules engine 324 and trigger event list 322. Client device 102 may append the encrypted and/or hashed copies of rules engine 324 and trigger event list 322 to the data specifying transaction 308 (e.g., cryptographic hash 308A, public key 308B, and digital signature 308C), and transmit the data specifying transaction 308B to one or more of peer systems 160 for verification, processing (e.g., additional cryptographic hashing) and inclusion into a new block of the hybrid block-chain ledger.

Private crypto key 302A may enable client device 102 (e.g., associated with user 108) to access encrypted event trigger list 322 upon extraction from the hybrid block-chain ledger. In some embodiments, private crypto key 302A provides client device 102 with read-only access to the encrypted event trigger list 322. Client device 102 may obtain private crypto key 302A from system 140 using secured out-of-band communications or as input provided by user 108 through a web page or other graphical user interface (GUI) presented by client device 104.

Ownership of the tracked asset portion may be transferred from user 108 to user 110 upon verification and publication of the data specifying transaction 308 within a corresponding block of the hybrid block-chain ledger by peer systems 160. User 110 may elect to further transfer that tracked asset portion to yet another user (e.g., user 112). For example, the one or more software applications executed by client device 104 may cause client device 104 to perform operations that generate input and output data specifying a new transaction (e.g., transaction 310 of FIG. 3) that transfers ownership of the tracked asset portion from user 110 to user 112, and that transmit the generated data to one or more of peer systems 160 for verification, processing (e.g., additional cryptographic hashing) and inclusion into a new block of the hybrid block-chain ledger.

Data specifying transaction 310 may include a cryptographic hash 310A of prior transaction 308, a quantity or number of units of the tracked asset portion that are subject to transfer in transaction 310, and a public key 310B of user 112. The data specifying transaction 310 may include a digital signature 310C of the user 110, which may be applied to hash 310A and public key 310B using a private key 310D of user 110. The presence of user 110's public key 308B within transaction data included within the hybrid block-chain ledger may enable various devices and systems (e.g., client devices 102, 104, and/or 106, peer systems 160, etc.) to verify user 110's digital signature 310C, as applied to data specifying transaction 310.

Client device 104 may also parse data specifying prior transaction 308 (e.g., as obtained from the current version of the hybrid block-chain ledger) and extract encrypted and/or hashed copies of rules engine 324 and trigger event list 322. Client device 104 may append the encrypted and/or hashed copies of rules engine 324 and trigger event list 322 to the data specifying transaction 310 (e.g., cryptographic hash 310A, public key 310B, and digital signature 310C), and transmit the data specifying transaction 310 to one or more of peer systems 160 for verification, processing (e.g., additional cryptographic hashing) and inclusion into a new block of the hybrid block-chain ledger. Ownership of the tracked asset portion may be transferred from user 110 to user 112 upon verification and publication of the data specifying transaction 310 within a corresponding block of the hybrid block-chain ledger by peer systems 160.

Private crypto key 302B may enable client device 104 (e.g., associated with user 110) to decrypt event trigger list 322 upon extraction from the hybrid block-chain ledger. Client device 104 may obtain private crypto key 302B from system 140 using secured out-of-band communications, and additionally or alternatively, as input provided by user 110 through a web page or other graphical user interface (GUI) presented by client device 104. Client device 104 may identify and extract private crypto key 302B from a portion of the hybrid block-chain ledger obtained from peer systems 160 (e.g., as a secure in-band communication).

In the embodiments described above, system 140 may establish and maintain rules (e.g., through a rules engine and corresponding list of triggering events) that facilitate regulatory-based, policy-based, and/or customer-specified controls of transactions involving assets tracked within a hybrid block-chain ledger. For example, client devices 102, 104, and/or 106 may generate transaction data that includes a rules engine and list of triggering events, and one or more of peer systems 160 may embed the generated transaction data into blocks of the hybrid block-chain ledger for reference in subsequent transactions. System 140 may be configured to detect an occurrence of an event (e.g., based on data received from client devices 102, 104, and/or 106, etc.), may determine whether the list of triggering events includes the detected event, and when triggering event list includes the detected event, perform one or more operations consistent with an established rule that references the detected event, as described below with reference to FIG. 4.

Figure 4:
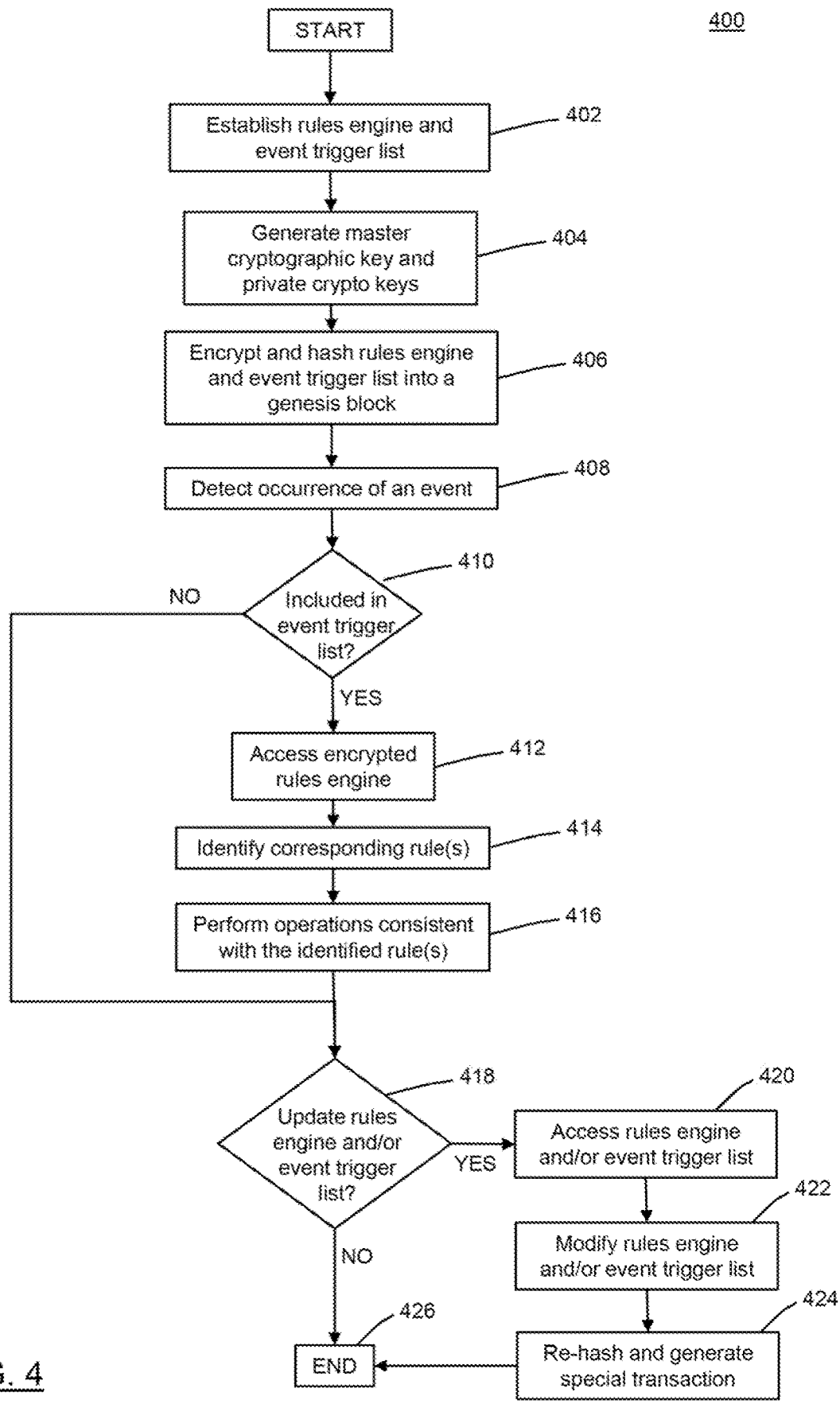
FIG. 4 is a flowchart of a process for performing event-based operations on assets tracked within a distributed electronic ledger in accordance with some embodiments.

FIG. 4 is a flowchart of a process 400 for automatically performing event-based operations on assets tracked within a hybrid block-chain ledger in accordance with some embodiments. In an embodiment, a centralized authority may be assigned to establish regulatory-based, policy-based, and/or customer-specified control over assets tracked within the hybrid block-chain ledger. In some aspects, tracked assets in accordance with various embodiments may include units of a virtual currency or a crypto-currency, units of financial instruments held by one or more owners, and physical assets utilized by one or more individuals and/or entities. In some aspects, a computer system associated with the centralized authority (e.g., system 140 associated with business entity 150) may execute one more stored application programs to cause system 140 to recover, authorize, audit, and/or verify an ownership of at least a portion of the tracked assets and/or transactions involving the tracked assets based on established and maintained rules.

One or more computing components of system 140 may generate cryptographic keys that facilitate the exemplary regulation of transactions (e.g., distributions, transfers, and/or actions) involving assets tracked within the hybrid public-private ledger (e.g., in step 404). For example, in step 402, system 140 generates a master cryptographic key with which system 140 may encrypt the generated and stored rules engine. In some aspects, certain aspects, system 140 may store copies of the generated master key in a portion of data repository 144 that is not accessible to user 110 (and any other users), thus maintaining confidence in the generated master key.

In step 402, system 140 may also perform operations that generate and maintain additional private cryptographic keys (e.g., private "crypto" keys) associated with each user who may be an owner of the assets tracked within the hybrid block-chain ledger. The generated private crypto keys may enable a device of each user to decrypt and access the list of triggering events and additionally or alternatively, metadata identifying the centralized authority. System 140 may store copies of the generated private crypto keys in a portion of data repository 144. Furthermore, system 140 may also perform operations that provide corresponding ones of the private crypto keys to users 108, 110, and/or 112 through secure, non-accessible and/or out-of-band communications.

One or more computing components of system 140 may generate a rules engine and a list of triggering events, which may be stored within a portion of data repository 144 (e.g., in step 404). For example, the generated and stored rules engine may identify or more rules that regulate a distribution of the tracked assets, an initiation of one or more transactions involving the tracked assets (e.g., a sale, a use of the tracked assets as collateral in a secured transaction etc.), and further, any additional or alternate action involving the tracked assets and/or the hybrid public-private ledger (e.g., processes that generate additional cryptographic key sets for user 110, processes that recover assets tracked in the hybrid public-private ledger, etc.). The generated and stored list of triggering events may include information that specifies causal relationships between one or more of the established rules and one or more events that trigger an initiation of one or more corresponding regulated distributions, transfers, and/or actions involving assets tracked within the hybrid public-private ledger (e.g., the triggering events).

System 140 may establish, in step 404, one or more of the rules and/or triggering events to reflect regulations and/or policies promulgated by governmental entity, a financial regulator, and/or the centralized authority. For example, system 140 may establish a loss of a private key by user 110 as a "triggering event" that would cause system 140 to perform operations that generate a new pair of public and private block-chain keys for user 110 in response to a verification of particular authentication credentials. System 140 may deem a documented theft of a portion of the tracked assets a "triggering event" that would cause system 140 to perform operations to recover the stolen portion of the tracked assets and generate a new pair of public and private block-chain keys for user 110.

System 140 may establish, in step 404, one or more of the rules and/or triggering events based on information received from user 110 (e.g., as input provided to a web page or other graphical user interface (GUI) presented by client device 104 and provided to system 140). For example, user 110 may specify a particular distribution of tracked assets (e.g., recurring bill payments, etc.) in response to an accident that may occur in the future involving user 110 and/or user 110's death (e.g., triggering events). Various embodiments are, however, not limited to these exemplary triggering events and corresponding rules, and in further embodiments, system 140 may establish any additional or alternate rules and/or triggering events appropriate to the tracked assets, to business entity 150, and further, to users 108, 110, and 112.

In step 406, system 140 may perform operations that encrypt the generated and stored rules engine (e.g., using the master encryption key) and further, that encrypt the generated and stored list of triggering events (e.g., using any technique that facilitates decryption using the private crypto keys). For example, system 140 may perform operations in step 406 that hash the encrypted rules engine and list of triggering events into a genesis block of the hybrid block-chain ledger, the contents of which may be incorporated (e.g., by client devices 102, 104, and/or 106, peer systems 160, etc.) into each of the subsequent transaction blocks generated and appended to the hybrid block-chain ledger. By incorporating the hashed and encrypted rules engine and list of triggering events into the blocks of the hybrid block-chain ledger, various embodiments may ensure that the established rules are followed even in an event of actions by malicious parties that disrupt the tracked assets (e.g., instances of Bitcoin™ peeling, etc.).

In some embodiments, one or more computing components of system 140 may detect an occurrence of an event involving a portion of the tracked assets, an owner of a portion of the tracked assets, and/or a transaction involving a portion of the detected assets (e.g., in step 408). For example, system 140 may receive data from client device 104 that indicates user 110 lost a corresponding private block-chain key associated with a portion of the tracked assets. In other instances, system 140 may detect an event in step 140 based on data received across network 120 from one or more systems associated with local, state, and/or federal governmental entities (e.g., data from a law enforcement system notifying business entity 150 of a theft of a portion of the tracked assets, data from a local government confirming a death of an owner of a portion of the tracked assets, etc.). In additional instances, system 140 may detect an occurrence of an event based on one or more sensors and devices communicatively connected to network 120 and capable of transmitting data to system 140. Various embodiments are, however, not limited to these exemplary events, and in further embodiments, system 140 may be configured to detect any additional or alternate event appropriate to the tracked assets and to the components of computing environment 100.

System 140 may also be configured to access the stored list of triggering events (e.g., within database 144), and may determine whether the list of triggering events includes the detected event (e.g., in step 410). If system 140 identifies the detected event as being within the list of triggering events (e.g., step 410; YES), system 140 may establish the detected event as a triggering event, and may access the encrypted rules engine using the master encryption key (e.g., in step 412). System 140 may further identify, within the accessed rules engine, one or more of the established rules that are causally related to the detected triggering event (e.g., in step 414). Further, system 140 may be configured to perform one or more operations, either individually or in sequence, that are consistent with the identified rules (e.g., in step 416). For example, the accessed rules engine may include information identifying the one or more operations associated with the identified rules. In other instances, at least one of the performed operations may represent a default operation associated with the identified rules (e.g., a specific type of authentication required before performing the one or more operations on behalf of user 110).

In one embodiment, one or more computing components of system 140 may also determine whether to update portions of the generated rules engine and/or list of triggering events (e.g., in step 418). For example, system 140 may identify an update or modification to one or more regulations and/or policies promulgated by governmental entity, a financial regulator, and/or the centralized authority. In other instances, system 140 may obtain, from client device 104, information updating a rule and/or triggering event previously established by system 140 based on input received from user 110 (e.g., through a web page and/or GUI presented by client device 104).

If system 140 determines to update portions of the generated rules engine and/or list of triggering events (e.g., step 418; YES), system 140 may access appropriate portions of the rules engine and/or list or triggering events in step 420 (e.g., using the master encryption key), and may modify the appropriate portions of the rules engine and/or list of triggering events to reflect the updated regulations, policies, user-specified rules, and/or user-specified events (e.g., in step 422). In some instances, system 140 may modify the accessed rules engine by adding a new rule, deleting an existing rule, modifying one or more parameters of an existing rule, and/or modifying one or more operations associated with an existing rule. In other instances, system 140 may modify the accessed list of event triggers to add a new triggering event, delete an existing triggering event, and/or add or modify parameters associated with an existing triggering event.

System 140 may encrypt and re-hash the modified rules engine and/or list of triggering events, and may submit the encrypted and hashed modified rules engine and/or list of triggering events to one or more of peer systems 160 for inclusion in a block of the hybrid block-chain ledger (e.g., in step 424). For example, one or more of peer systems 160 may incorporate the hashed and encrypted modified rules engine and/or list of triggering events into the hybrid block-chain ledger as a special transaction (e.g., a "0" value transaction), such that the hybrid block-chain ledger tracks each change within the modified rules engine and/or list of triggering events. Exemplary process 400 is then complete in step 426.

Referring back to step 418, if system 140 determines that no modification to the rules engine and/or the list of triggering events is warranted (e.g., step 418; NO), exemplary process 400 may proceed to step 426, and exemplary process 400 is complete. Further, and in reference to step 410, if system 140 determines that the list of triggering events does not include the detected event (e.g., step 410; NO), exemplary process 400 may proceed to step 418, and system 140 may determine whether to update portions of the rules engine and/or list of triggering events using any of the exemplary processes described above.

In the embodiments described above, and through the generation of the master cryptographic key and management of the generated rules engine and corresponding list of triggering events, system 140 may perform operations that recover, authorize, audit, and/or verify an ownership of at least a portion of the tracked assets and/or transactions involving the tracked assets. The operations performed by system 140, which utilize hybrid block-chain ledgers in accordance with various embodiments, would not be possible using the conventional block-chain ledgers described above.

For example, user 110 may be a user of a virtual or crypto-currency (e.g., Bitcoin™) and may store a private key (e.g., private key 310D) on a laptop computer (e.g., client device 104) to generate and confirm Bitcoin™ transactions. In one instance, user 110 may unfortunately drop the laptop into a swimming pool while confirming a Bitcoin™ with private key 310D, and upon retrieval from the swimming pool, user 110 may establish that the laptop no longer functions and that data on the laptop is not recoverable.

Traditionally, through a device in communication with network 120 (e.g., user 110's smartphone), user 110 may access a conventional block-chain ledger, such as those conventional architectures outlined above, and determine that the Bitcoin™ transfer was incomplete when user 110 dropped the laptop into the swimming pool. Further, user 110 may determine that the Bitcoin™ transaction represents an orphaned block within the conventional block-chain ledger, and the Bitcoins™ associated with the orphaned block are unrecoverable and permanently lost.

In some embodiments, user 110 may access a hybrid block-chain ledger (e.g., as described with reference to FIG. 3), and may determine that the Bitcoin™ transfer was incomplete when user 110 dropped the laptop into the swimming pool. In some embodiments, however, user 110 may provide input to the smartphone identifying the unrecoverable private key, which the smartphone may transmit to system 140 across network 120. In some aspects, system 140 may receive the transmitted message (e.g., in step 408), may determine that user 110's loss of private key 310D represents a triggering event (e.g., step 410; YES), and may perform operations that authenticate user 110's identity and that regenerate a pair of private and public block-chain keys for user 110, which system 140 may transmit to user 110 through any of the secure non-accessible processes outlined above (e.g., in steps 412, 414, and 416). Upon receipt of the newly generated private key, user 110 may access the hybrid block-chain ledger (e.g., through the smartphone) and confirm the Bitcoin™ transfer to recover the crypto-currency.

Further, and by way of example, user 110 may access a wallet application executed by client device 104, and further, may determine that the mobile wallet is missing a number Bitcoins™. User 110 may suspect that the loss of the Bitcoins™ represents a theft by a malicious entity, and through a complex search of a corresponding block-chain ledger (e.g., conventional block-chain ledgers described above, and/or hybrid block-chain ledgers in accordance with various embodiments), user 110 may trace the theft of the Bitcoins™ to a single transaction within a corresponding block. User 110 may contact the police and report the theft, and the police may confirm the accuracy of user 110's allegations regarding the theft.

User 110 may, in some instances, be capable of processing the conventional block-chain ledgers described above to determine an address of the malicious entity responsible for the theft. The decentralized and anonymous nature of conventional block-chain ledgers may, however, prevent user 110 from identifying the malicious entity, and the stolen Bitcoins™ may remain permanently unrecoverable.

Various embodiments may, however, address the deficiencies of conventional block-chain ledgers and provide user 110 with recourse to recover the stolen Bitcoins™. For example, the police may notify the centralized authority of the theft of user 110's Bitcoins™ and provide a destination address associated with the malicious entity (e.g., through a message transmitted to system 140 and received, e.g., in step 408). System 140 may determine that the theft of the Bitcoins™ represents a triggering event included within the generated list (e.g., step 410; YES), and may perform operations that automatically create a request for a new transaction that returns the stolen Bitcoins™ to user 110 using any of the exemplary techniques described above (e.g., in steps 412, 414, and 416). System 140 may also perform operations that regenerate a pair of private and public block-chain keys for user 110, which system 140 may transmit to user 110 through any of the secure non-accessible processes outlined above (e.g., in steps 412, 414, and 416).

The hybrid block-chain ledger architectures described above may add a level of sophistication to conventional mechanisms for trustless communication by allowing transactions involving tracked assets to occur according to common transaction rules. Further, the hybrid block-chain ledger architectures in accordance with various embodiments may allow owners of the tracked assets to project authority over the tracked assets by establishing customized rules for transaction authorization. Furthermore, and in contrast to conventional techniques described above, the hybrid block-chain ledger architecture may enable a centralized authority (e.g., business entity 150 associated with system 140) to recover, authorize, audit, and/or verify an ownership of at least a portion of the tracked assets and/or transactions involving the tracked assets based on established and maintained rules.

In various embodiments, through the generation of a master cryptographic key and management of a generated rules engine and corresponding list of triggering events, system 140, acting as a centralized authority, may perform operations that recover, authorize, audit, and/or verify an ownership of at least a portion of the tracked assets and/or transactions involving the tracked assets. In some aspects, and as outlined above, tracked assets in accordance with various embodiments may include units of a virtual currency or a crypto-currency, units of financial instruments held by one or more owners, and physical assets utilized by one or more individuals and/or entities.

In additional aspects, the exemplary hybrid block-chain algorithms described above may track a location, performance, usage, and/or status of one or more additional client devices (referred to as "connected devices") disposed within computing environment 100 (not shown in FIG. 1), which may be configured to establish communications with client devices 102, 104, and 106, and further, with system 140, using any of the communications protocols outlined above. For example, client devices 102, 104, and 106, system 140, and the connected devices may be uniquely identifiable and addressable within communications network 120, and may be capable of transmitting and/or receiving data across the established communications sessions. System 140 may be configured to establish the communications sessions with one or more of the connected devices, and to exchange data with the connected devices autonomously and without input or intervention from a user of client device 104 (e.g., user 110).

In some aspects, the connected devices may be implemented as a processor-based and or computer-based device that includes one or more processors and tangible, computer-readable memories. For example, connected devices in accordance with various embodiments may include mobile communications devices (e.g., mobile telephones, smart phones, tablet computers, etc.) and other devices capable of communicating with client device 104 (e.g., internet-ready televisions, internet-ready appliances and lighting fixtures, computing devices disposed within motor vehicles, etc.).

The connected devices may include sensor devices in communication with the one or more processors and the memories. The sensor devices may be configured to monitor the usage, location, status (e.g. maintenance status, performance status), etc., of corresponding ones of the connected devices, and may be configured to provide sensor data to corresponding ones of the processors. In some aspects, the sensor data may include data identifying a current state, data specifying intended and/or unintended interaction with one or more of users 108, 110, and/or 112 (e.g., through client devices 102, 104, and/or 106), inadvertent interactions (e.g., drops, other accidental interactions, etc.), and data describing any additional or alternate characteristics of the connected devices capable of being monitored and quantified by the sensor devices (maintenance data relative to a maintenance milestone, performance data relative to a performance threshold).

Computing environment 100 may include one or more additional computing systems in communication with the connected devices using any of the communications protocols outlined above. In some embodiments, the additional computing system include one or more sensor devices capable of monitoring a location, performance, usage, and/or status of the connected devices, which may establish a "sensor network" capable of monitoring the connected devices. These additional computing systems may provide the additional sensor data to the connected devices using any of the communications protocols outlined above, either a regular intervals or in response to requests from the connected devices. In some instances, the additional computing systems may be implemented as processor-based and/or computer-based systems consistent with the exemplary systems described above.

The connected devices may be configured to transmit portions of the sensor data (e.g., as detected by on-board sensor devices and/or received from the sensor network) to client devices 102, 104, and/or 106 and additionally or alternatively, to system 140, using any of the communications protocols outlined above. For example, the sensor data may characterize an interaction between the connected devices and users 108, 110, and 112 (e.g., the monitored data may represent usage data indicative of a consumption of one or more services provided by the connected devices), and the connected devices may transmit the usage data for users 108, 110, and/or 112 to corresponding ones of client devices 102, 104, and/or 106, which may store the received usage data in a corresponding data repository. The connected devices may also transmit the usage data to system 140, along with information linking specific elements of the usage data to corresponding users and/or client devices (e.g., user 110's usage data may be linked to an identifier of user 110 and/or of client device 104). As described below in reference to FIGS. 4 and 5, client devices 102, 104, and/or 108 may also incorporate corresponding portions of the monitored data, e.g., as received from the connected devices, into hybrid block-chain ledgers in accordance with various embodiments in order to record, track, and publicly monitor the location, performance, usage, and/or status of the connected devices.

Figure 5A:
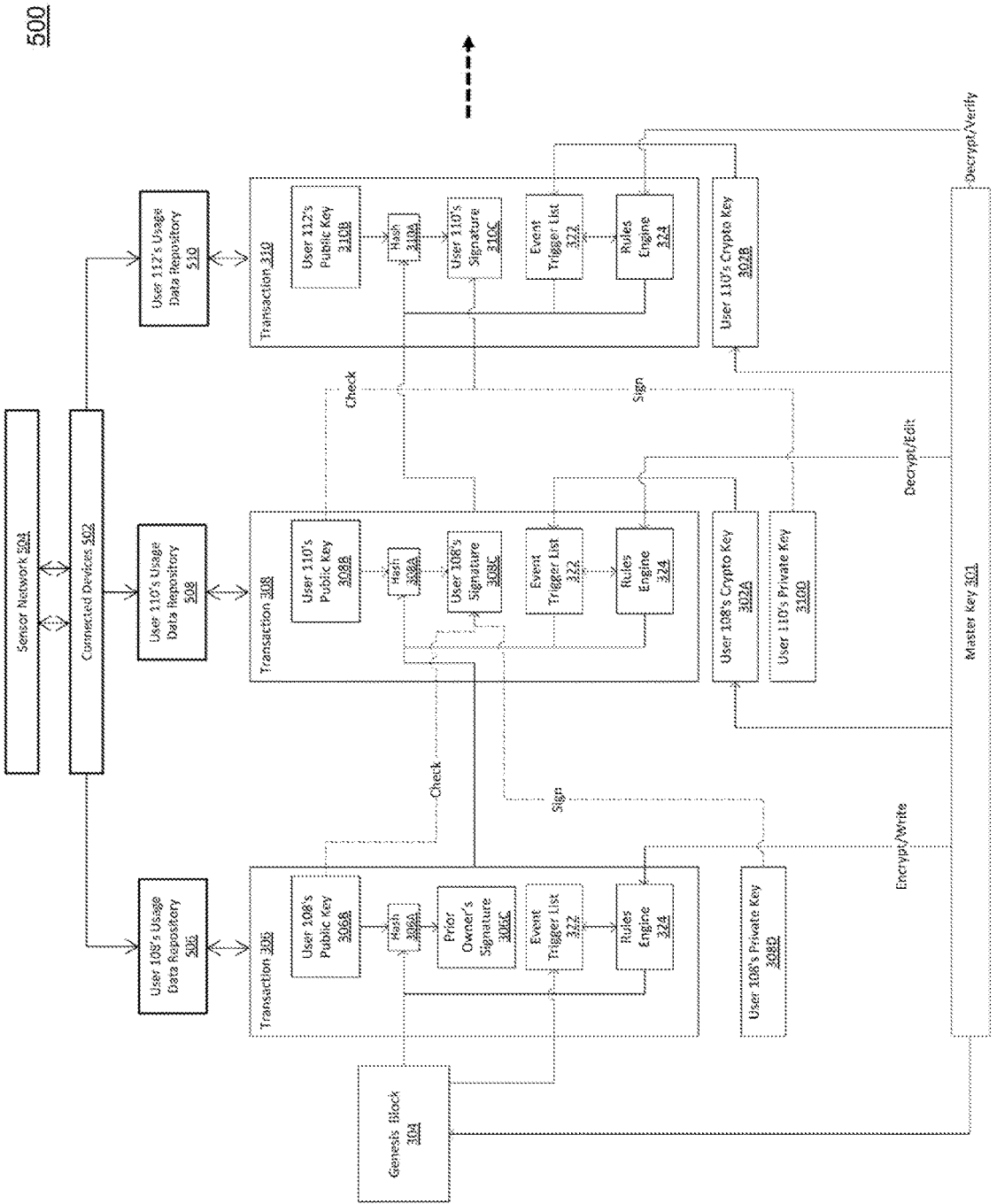
FIGS. 5A and 5B are diagrams of distributed public-private electronic ledger architectures capable of tracking usage data of users in accordance with some embodiments.

FIG. 5A is a schematic diagram illustrating an exemplary structure 500 of a hybrid, public-private block-chain ledger, which may be generated through the interaction of components of computing environment 100, in accordance with various embodiments. For example, as described in reference to FIG. 4, users 108, 110, and 112 may be associated with corresponding devices (e.g., client devices 102, 104, and 106), which may be configured to execute one or more stored software applications (e.g., a wallet application) capable of obtaining a current version of a hybrid block-chain ledger from one or more networked computer systems (e.g., one of peer systems 160 configured to "mine" broadcast transactions and update ledgers).

Embodiments shown in FIG. 5A may incorporate the exemplary hybrid block-chain ledger described above in reference to FIG. 3 (e.g., hybrid block-chain ledger structure 300), and may augment hybrid block-chain ledger structure 300 to include and track monitored data indicative of a location, performance, usage, and/or status of one or more connected devices 502 disposed within environment 100 and in communication with client devices 102, 104, and 106. For example, connected devices 502 may be implemented as processor-based and/or computer-based systems that include one or more processors and corresponding tangible, non-transitory computer-readable memories.

The one or more processors of connected devices 502 may obtain sensor data from one or more on-board sensor devices capable of monitoring connected devices 502 and additionally or alternatively, from one or more external sensor devices disposed within additional computing systems in communication with connected devices 502. The on-board and external sensor devices may, in some aspects, collectively form a sensor network 504 that generates and provides sensor data to the connected devices. For instance, the sensor data may include data identifying a current state, data specifying intended and/or unintended interaction with one or more of users 108, 110, and/or 112 (e.g., through client devices 102, 104, and/or 106), inadvertent interactions (e.g., drops, other accidental interactions, etc.), and data describing any additional or alternate characteristics of the connected devices capable of being monitored and quantified by the sensor devices. The connected devices may be configured to transmit portions of the received sensor data to corresponding ones of client devices 102, 104, and 106, and to system 140, using any of the communications protocols outlined above (e.g., through peer-to-peer communications, etc.), and to receive a notification to be displayed on a user interface (e.g. GUI) of the connected device.

For example, the sensor data received by connected devices 502 may specify usage or consumption of one or more services of the connected devices by corresponding ones of users 108, 110, and 112 (e.g., associated with client devices 102, 104, and 106). In some aspects, portions of the usage data attributable to corresponding ones of users 108, 110, and 112 may be transmitted to corresponding ones of client devices 102, 104, and 106, and further, to system 140. The user-specific portions of the usage data may be stored within corresponding user-specific usage data repositories (e.g., usage data repositories 506, 508, and/or 510 of FIG. 5A). In some embodiments, as described below in reference to FIG. 5A, client devices 102, 104, and/or 106, in conjunction with system 140, may augment the exemplary hybrid block-chain ledger structures described above to include usage data and corresponding metadata, thus enabling the hybrid block-chain ledger to monitor the location, performance, usage, and/or status of the connected devices over time (e.g., during transfers in ownership of the connected devices, use of the connected devices including as collateral, etc.).

Figure 6:
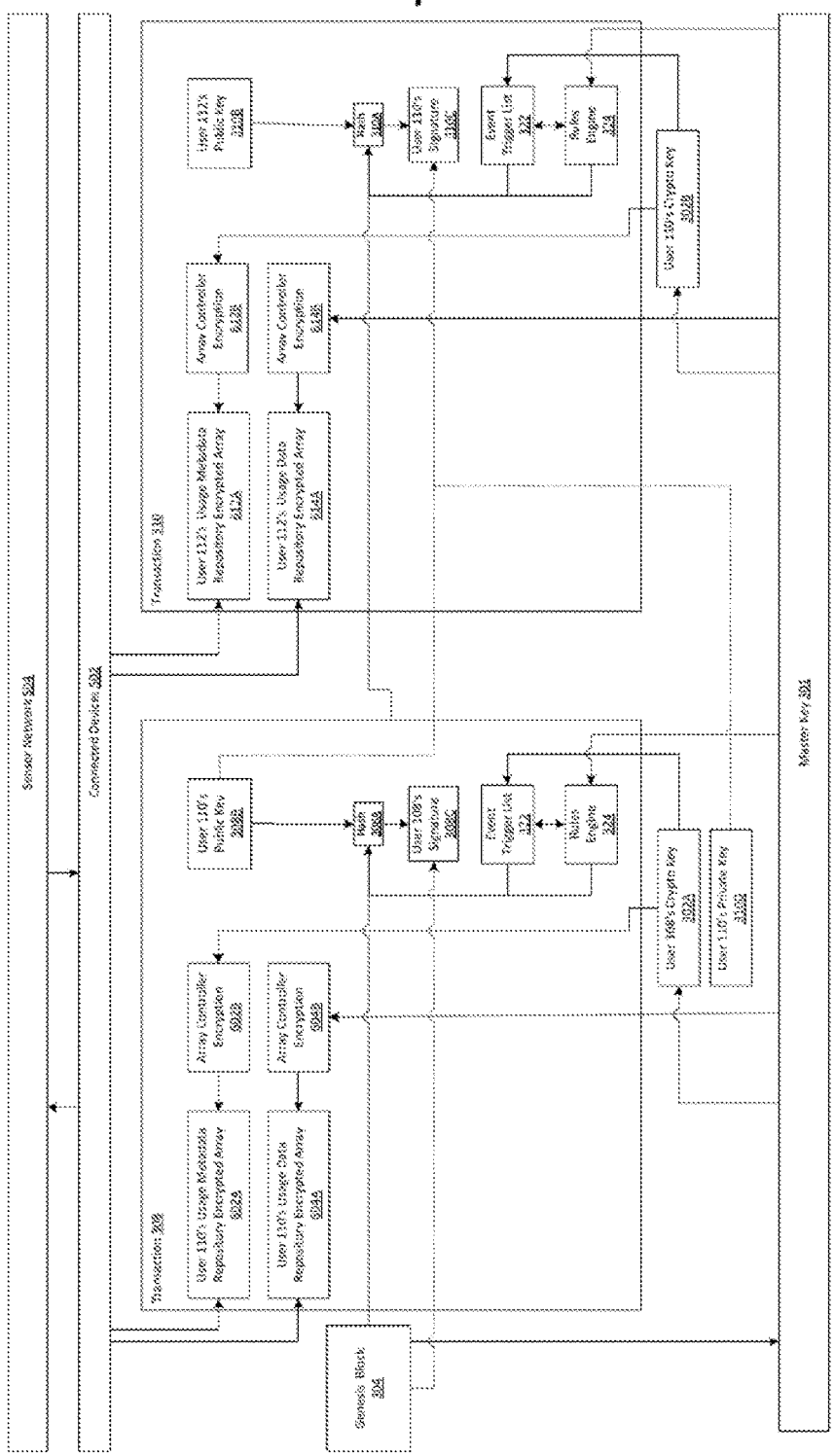
FIG. 6 is a diagram of a distributed public-private electronic ledger architecture capable of encrypting usage data and metadata in accordance with some embodiments.

FIG. 6 is a schematic diagram of illustrating an exemplary structure 600 of a hybrid, public-private block-chain ledger, which may be generated through the interaction of components of computing environment 100, in accordance with various embodiments. For example, as described in reference to FIG. 6, users 108, 110, and 112 may be associated with corresponding devices (e.g., client devices 102, 104, and 106), which may be configured to execute one or more stored software applications (e.g., a wallet application) capable of obtaining a current version of a hybrid block-chain ledger from one or more networked computer systems (e.g., one of peer systems 160 configured to "mine" broadcast transactions and update ledgers).

Some embodiments shown in FIG. 5A may incorporate the exemplary hybrid block-chain ledger described above in reference to FIGS. 3 and 5A (e.g., hybrid block-chain ledger structures 300 and 400), and may augment hybrid block-chain ledger structure 300 of FIG. 3 to include and track monitored data indicative of a location, performance, usage, and/or status of one or more connected devices 502 disposed within environment 100 and in communication with client devices 102, 104, and 106, as received from sensor network 404.

A prior owner (e.g., user 108) may elect to further transfer a portion of tracked assets to an additional user (e.g., user 110). For example, the one or more software applications executed by client device 102 may cause client device 102 to perform operations that generate input and output data specifying a new transaction (e.g., transaction 308 of FIG. 6) that transfers ownership of the tracked asset portion from user 108 to user 110, and further, that transmit the generated data to one or more of peer systems 160 for verification, processing (e.g., additional cryptographic hashing) and inclusion into a new block of the hybrid block-chain ledger.

For example, data specifying transaction 308 may include a cryptographic hash 308A of a prior transaction (e.g., which transferred ownership to user 108), a quantity or number of units of the tracked asset portion that are subject to transfer in transaction 308, and a public key of the recipient (e.g., public key 308B of user 110). Further, in some aspects, the data specifying transaction 308 may include a digital signature 308C of the user 108, which may be applied to hash 308A and public key 308B using a private key 308D of user 108. The presence of user 108's public key within transaction data included within the conventional block-chain ledger may enable various devices and systems (e.g., client devices 102, 104, and/or 106, peer systems 160, etc.) to verify the user 108's digital signature 308C, as applied to data specifying transaction 308. Client device 104 may also parse data specifying the prior transaction and extract encrypted and/or hashed copies of rules engine 324 and trigger event list 322.

The data specifying transaction 308 may also include user 108's usage data (e.g., as received from connected devices 502), which may be encrypted using master key 301 (e.g., by array controller encryption 604B) to generate an encrypted array 604A of user 108's usage data. The data specifying transaction 308 may also include metadata indicative of a duration of usage, time, date, location, and/or other network connected devices in proximity, which may be encrypted using private crypto key 302A of user 108 (e.g., by array controller encryption 602B) to generate an encrypted array of metadata 602A.

Client device 102 may append the encrypted and/or hashed copies of rules engine 324 and trigger event list 322 to the data specifying transaction 308 (e.g., cryptographic hash 308A, public key 308B, and digital signature 308C) and the usage data (e.g., encrypted arrays 602A and 604A from array controller encryption 602B and 604B), and transmit the data specifying transaction 308 to one or more of peer systems 160 for verification, processing (e.g., additional cryptographic hashing) and inclusion into a new block of the hybrid block-chain ledger.

User 110 may elect to further transfer that tracked asset portion to yet another user (e.g., user 112). For example, the one or more software applications executed by client device 104 may cause client device 104 to perform operations that generate input and output data specifying a new transaction (e.g., transaction 310 of FIG. 6) that transfers ownership of the tracked asset portion from user 110 to user 112, and further, that transmit the generated data to one or more of peer systems 160 for verification, processing (e.g., additional cryptographic hashing) and inclusion into a new block of the hybrid block-chain ledger.

Data specifying transaction 310 may include a cryptographic hash 310A of prior transaction 308, a quantity or number of units of the tracked asset portion that are subject to transfer in transaction 310, and a public key 310B of user 112. Further, in some aspects, the data specifying transaction 310 may include a digital signature 310C of user 110, which may be applied to hash 310A and public key 310B using a private key 310D of user 110. The presence of user 110's public key 308B within transaction data included within the hybrid block-chain ledger may enable various devices and systems (e.g., client devices 102, 104, and/or 106, peer systems 160, etc.) to verify user 110's digital signature 310C, as applied to data specifying transaction 310.

Data specifying transaction 310 may also include user 110's usage data (e.g., as received from connected devices 402), which may be encrypted using master key 301 (e.g., by array controller encryption 614B) to generate an encrypted array 614A of user 108's usage data. The data specifying transaction 308 may also include metadata indicative of a duration of usage, time, date, location, and/or other network connected devices in proximity, which may be encrypted using user 110's private crypto key 302A (e.g., by array controller encryption 612B) to generate an encrypted array of metadata 612A.

Client device 104 may append the encrypted and/or hashed copies of rules engine 322 and trigger event list 324 to the data specifying transaction 310 (e.g., cryptographic hash 310A, public key 310B, and digital signature 310C) and the usage data (e.g., encrypted arrays 612A and 614A from array controller encryption 612B and 614B), and transmit the data specifying transaction 310 to one or more of peer systems 160 for verification, processing (e.g., additional cryptographic hashing) and inclusion into a new block of the hybrid block-chain ledger.

The inclusion of usage data within hybrid block-chain ledgers maintains a continuous log of usage and/or consumption of connected-device resources by users 108, 110, and 112, and any additional or alternate users that generate and submit (through corresponding client devices) transaction data to one or more of peer systems 160. The sensor data (e.g., as received from connected devices 502) may be batched in a periodic set and treated as a transaction, and may be appended into an associated repository of the transaction block-chain (e.g., using system 140, peer systems 160, etc.).

Figure 5B:
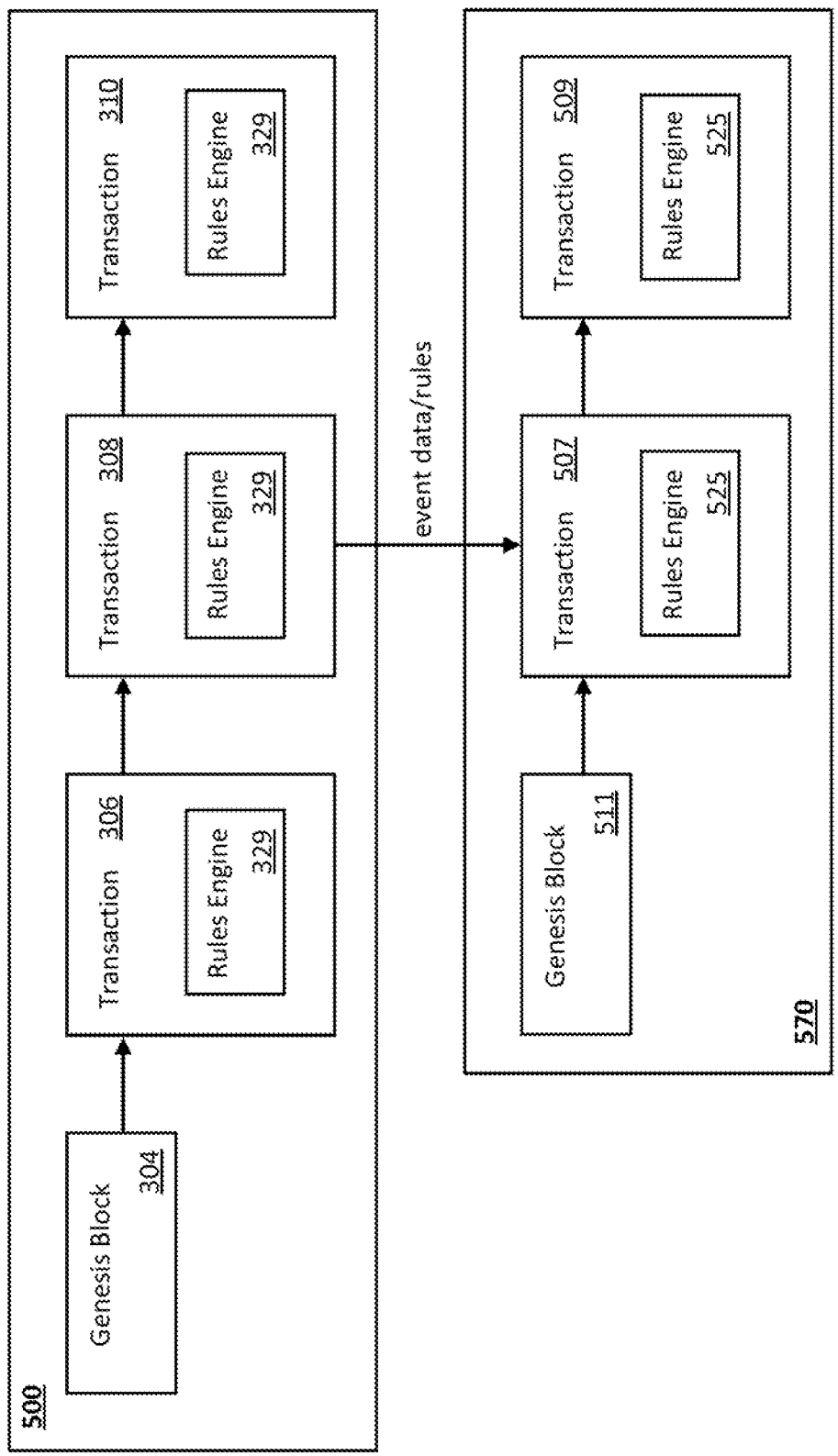

FIG. 5B is a schematic diagram illustrating the exemplary structure 500 of FIG. 5A, and an exemplary structure 570 of an additional hybrid, public-private block-chain ledger, which may also be generated through the interaction of components of computing environment 100, in accordance with various embodiments. The hybrid, public-private block-chain ledger of the exemplary structure 500 may be associated with a first entity, while the additional hybrid, public-private block-chain ledger of the exemplary structure 570 may be associated with a second entity. As illustrated, the additional hybrid, public-private block-chain ledger of structure 570 includes a genesis block 511, and additional transactions 507 and 509. Each of the additional transactions 507 and 509 may be in a corresponding block of the block-chain. In addition, each of the additional transactions 507, 509 may include an encrypted and/or hashed rules engine 525. As described herein, the additional hybrid, public-private block-chain ledger of the exemplary structure 570 may receive event data and/or rules (e.g., modified rules) from the hybrid, public-private block-chain ledger of the exemplary structure 500 for inclusion in a block of the additional hybrid, public-private block-chain ledger. In some instances, the exemplary block-chain ledgers described above may facilitate processes that track an ownership of one or more of the connected devices and enable current owners (e.g., user 110) to transfer ownership to others (e.g., user 112). For example, when a new block is created to account for usage data, a private key of the current owner may be used to authenticate the usage and allow for the generation of the new block. A private key linked to a device of the current owner (e.g., stored locally on a memory of the current owner's device) may authenticate the usage and allow for the generation of the new block without input or intervention from the current owner. In some instances, the private key of the current owner's device may differ from the current owner's private key, The automated and programmed authentication of the usage by the current owner's device may reduce instances of under-reported usage data associated with owner-initiated authentication protocols.

Exemplary Use Cases for Hybrid Private-Public Ledgers
Behavior Tracking Using Connected Devices Various embodiments may enable a business entity 150 (e.g., a financial institution) to track users' behavior and their ability to "care for" and/or "keep in good maintenance" one or more owned items (e.g., connected devices, such as cars, clothing, and appliances) and/or one or more financial obligations (e.g., timely monthly mortgage payments, timely payments of credit card bills, no overdrafts, etc.). For example, business entity 150 may, through system 140, monitor and collect user 110's historical behavior data in order to determine a "care score," which may factor into a credit adjudication process for user 110. For example, when system 140 accesses a block-chain repository to determine user 110's "care score,", system 140 may decrypt the current version of the hybrid block-chain ledger using the master key, and determine a score for either a specific category of products or an overall score based on the sensor data. System 140 may establish the "care rating" for user 110 based on the determined score. Further, various embodiments may maintain a record of corresponding usage data (e.g., within the disclosed exemplary hybrid block-chain ledgers) and adjust a deprecation value, which system 140 may store along with a unique identifier value as a key value pair.

Various embodiments also facilitate processes that group subsets of connected devices (e.g., various office equipment), track a usage of these connected devices as a group, and aggregate the above-described calculations for the group of connected devices. In some aspects, the tracking and manipulation of group usage data may balance out the heavy use of a singular item with items which are used infrequently.

Each of connected devices 502 may provide data indicative of usage, care, maintenance, and repayments to a centralized server (e.g., a server of system 140), which may perform operations that update a creditworthiness of an owner based on the predicted life of connected devices 502 and risk exposures (e.g., for purposes of providing insurance) in real time. Various embodiments may, for example, reward good behavior from an individual with rewards of better terms and/or penalize poor behavior, and thus customizing both load and insurance product to the individual.

For example, office equipment and a company car of a business owner may represent "connected devices," and various embodiments may monitor usage of the connected devices based on embedded sensors and/or a surrounding network of sensors disposed within in the environment. In some aspects, portions of the office equipment may be used infrequently (e.g., as most of the business is off premises), and system 140 may establish, based on the usage data, that the office equipment experiences a relatively low level of depreciation, while the company car experiences a substantial amount of depreciation. In accordance with various embodiments, system 140 may assign a "medium" deprecation rating to the collective group of connected devices (e.g., the office equipment and the company car) based on the usage data, and system 140 may leverage this information when the business owner attempts to collateralize these connected devices, e.g., in support of a loan application.

Ownership Tracking of Connected Devices and Payment

Embodiments described herein provide a product ownership tracking and control system. Techniques described above and herein for use of the hybrid block-chain ledger for tracking the ownership of assets can be applied to tangible goods, such as products, including manufactured products and Internet-of-things (IoT) enabled property (e.g. a smart house), and intangible goods such as businesses (e.g. company, corporation, LLC, etc.), enabling entities (e.g. joint owner entities, executors of an owner's estate, an owner's attorney, the judge in a case involving an owner, retailers, life insurance claims officers, governmental entities, purchasers, investors, etc.) in embodiments to track and control the ownership and value of these assets downstream after purchase settlement and/or transfer to, for example, joint owners of the assets. Product tracking in accordance with various embodiments is particularly relevant as the world moves toward a technological paradigm known as the Internet of Things (IoT), in which objects are provided with unique identifiers and/or IP addresses and can transfer data over a network without requiring human-to-human or human-to-computer interaction. Heretofore, conventional block chain ledgers could not be adapted to systems for both tracking and controlling the ownership of assets—and particularly joint or partial ownership of such assets—through a block chain ledger. For example, conventional block-chain ledgers could not be adapted to systems for tracking partial or joint ownership of various assets, as ownership rights, agreements, and entity statuses change over the course of time. Additionally, by way of example, actual cosigners of loans or accounts may experience difficulty in establishing their own individual responsibility in the instances of partially owned assets.

A possible solution to these problems is to use the hybrid block-chain ledger architecture in accordance with various embodiments described herein to function as a public repository chain that tracks ownership chains. In various embodiments, a hybrid block-chain ledger architecture functions as a shared distributed electronic ledger payment mechanism that, at the time of purchase settlement, assigns ownership to a purchased asset by making a connection to the asset and embedding the asset with an unique ownership identifier, and associated asset purchase information (e.g. timestamp and purchase value). By enabling the use of a hybrid block-chain ledger architecture, if there is split (e.g. partial, joint) ownership of the asset, various embodiments may record the multiple owners as a value pair and register corresponding percentages of ownership. Various embodiments may further complete registration of the purchased asset within the hybrid block-chain ledger, which tracks the ownership and allows the system and/or connected devices to periodically check-in with the ledger system to maintain a corresponding ownership record.

FIGS. 7A-7D illustrate various embodiments using a hybrid block-chain ledger for tracking product information, including the ownership, of a tangible good (e.g. a manufactured product). The methodology has particular usefulness when used with distributed ownership of products across two or more entities, as well as when used with connected products, that is with products that can be self-connected to a network, e.g., smart products. Controls for such products can be implemented through the block-chain by allowing for verification to occur anytime an entity's ownership interest is changed, re-allocated, or transferred. This control can be used to prevent or at least significantly deter fraudulent ownership transfers that are prevalent with some products. Controls can also be written into the block-chain such that validation or verification through the block-chain is required in order to allow the change, transfer, or re-allocation of an entity's ownership interest, and/or distribution of funds, relating to the product.

In the following examples, the process is illustrated with respect to the roles of various nodes and/or participants in the system, including a retailer of the good (702), a first partial or joint owner entity of the good (704), a second partial or joint owner entity of the good (706), the central authority (which may be a financial institution) (708), the ownership identifier (710), the hybrid block-chain (712), and peer system (713). The retailer, first joint owner, second joint owner, central authority and peer system are assumed to have processing devices for operating as a particular node of the system as described above in connection with FIG. 1 and for implementing the flow illustrated in FIGS. 7A-7D.

Figure 7A:
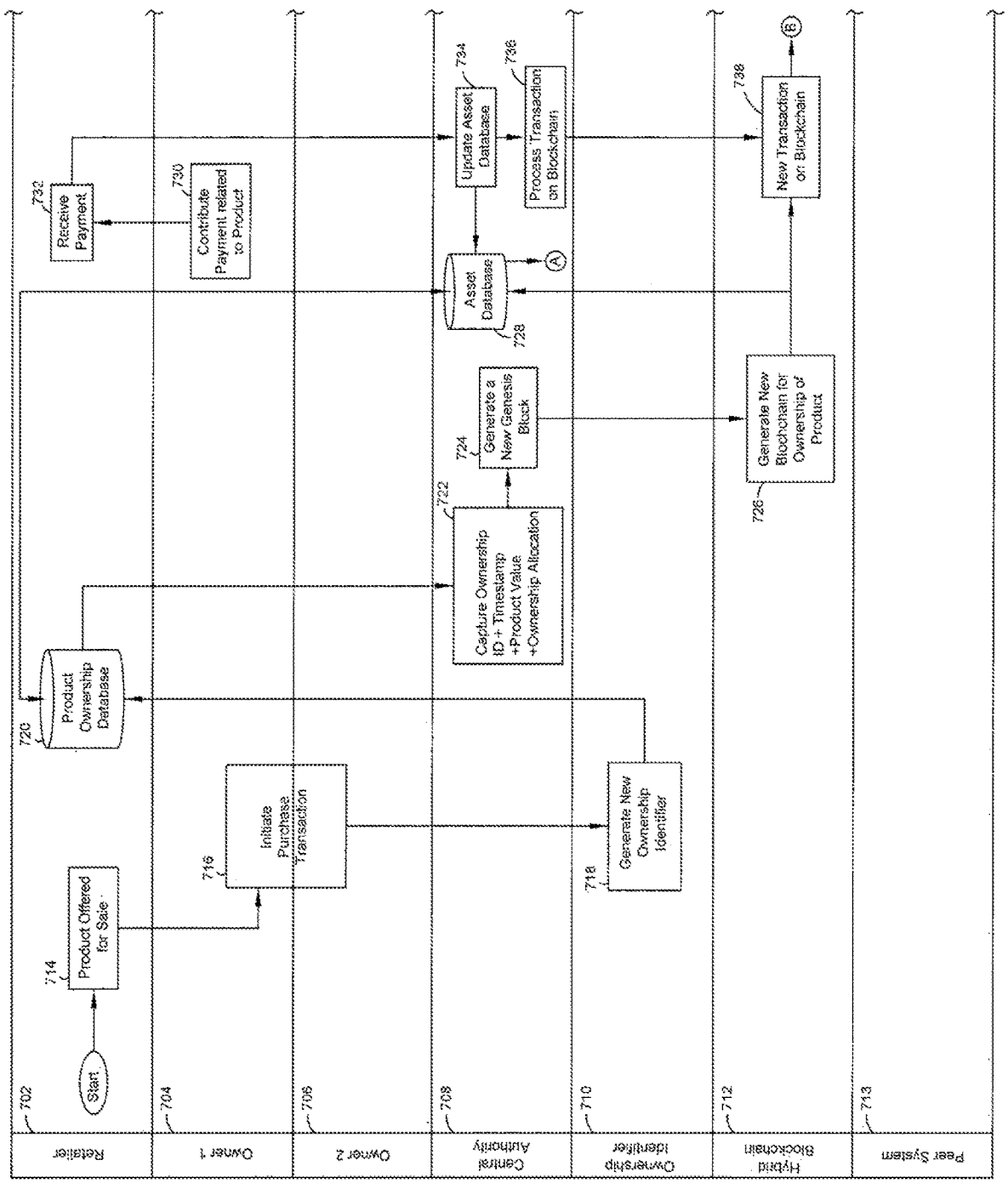
FIGS. 7A-7D are flow diagrams of processes for tracking product information using a distributed electronic ledger in accordance with some embodiments.

Referring to FIG. 7A, the process starts with a product being offered for sale (714). At 716, the first joint owner and the second joint owner initiate a purchase transaction of the product (716). The joint ownership of the product by the first and second joint owner is associated with an ownership identifier (718). In various embodiments, the ownership identifier is associated with all of the entities having a respective registered ownership interest in the product. In embodiments, the ownership identifier is any suitable unique identifying factor. In embodiments, the product identifier can be a serial number for the product or other unique identifying factor. This ownership ID may be generated by the retailer's (702) tracking system, by the central authority (708) or by any other suitable source.

At 720, the ownership ID and other pertinent information about the product normally maintained by a retailer (e.g., product details, purchase details, etc.) are entered into a product ownership database of the retailer.

At 722, the central authority (e.g., financial institution, insurance agency, or other centralized authority) captures relevant information from the retailer, and, in various embodiments, from the first and second joint owners, for starting the hybrid-block chain ledger. This information includes the ownership ID, and all intended rules associated with the ownership ID. For example, there may be rules relating to the allocation of ownership interest of the product between the first and second joint owners, disbursement of funds between the first and second joint owners relating to the product, vital and/or marital status of one or both of the first and second joint owners, etc. In various embodiments, this information also includes a timestamp of the purchase transaction and/or ownership transfer, an initial product value, and/or an initial ownership allocation. In various embodiments, this information also includes a product identifier (not shown) and all intended rules associated with the product identifier. For example, there may be rules relating to the maintenance, performance, and/or usage of the product. In various embodiments, the product ID can be a serial number for the product, or other unique identifying factor, and may be generated by the retailer's (702) tracking system, by a manufacturer's (not shown) tracking system, by the central authority (708), or by any other suitable source.

At 724, the central authority generates a new genesis block for a hybrid block chain. This genesis block includes the ownership ID information as well as the rules engine and event trigger list (described above) associated with the ownership ID. At 726, the central authority or other node in the network generates a new block-chain associated with the product(s) ownership being tracked, using the genesis block generated at 724. This block-chain is used to update the central authority's asset database (728) with the information associated with ownership of the product (e.g., ownership ID, rules and trigger events). Information in the product database 718 can be updated from the asset database 728 as reflected in FIG. 7A.

As illustrated in FIG. 7A, at 730, joint owner 1 contributes a payment relating to the product (e.g. a loan payment for the product). At block 732, payment is received by the retailer (702). For example, joint owner 1 could be a first signatory, and joint owner 2 could be a second signatory, on a loan for a product (e.g. a new car financing loan) and, at 730 and 732, the loan payment could be sent from the joint owner to the retailer who is financing the loan. In various embodiments, the central authority (708) rather than the retailer may receive payment from joint owner 1 at block 732 (e.g. central authority is financing a new car loan of joint owners 1 and 2).

In various embodiments, each time a payment relating to the product is received (from one of the joint owners), the asset database 728 is updated and optionally the product ownership database 720 is also updated. Specifically, a new transaction is written into the block-chain to validate that it is a valid transaction according to the originating rules (from the joint owners, retailer, and/or central authority) for the particular ownership of the particular product. The retailer and/or central authority (more specifically, the retailer's processor and/or the central authority's processor) is just a node in the network that creates its own block for the hybrid-block chain or provides information for creation of a new block in the block-chain to another processing node. For example, the retailer may inform the central authority that it has received a payment from joint owner 1 relating to the particular product. Details of this transaction are reported to the central authority to update the asset database (734) and this transaction is processed on the block-chain (736) by the central authority. In that operation, the central authority validates the transaction against the rules/trigger events associated with the ownership ID for the particular product. For example, the central authority could confirm that the payment was made within the terms defined by the retailer and/or central authority. The central authority may also automatically increase or re-allocate joint owner 1's registered ownership interest in the particular product in accordance with the rules defined by the joint owners, a governmental agency, retailer, and/or central authority, relating to the allocation of ownership interest of the product between the first and second joint owners. At 738, this new transaction (receipt of the payment from joint owner 1) is reflected as a new transaction on the block-chain in accordance with the description of the hybrid block-chain set forth above.

It should be appreciated that the validity of the transaction and the flow of the ownership of the product can be tracked entirely through the hybrid block-chain, as all of the pertinent information is contained in the block-chain, so the asset database 728 is not technically necessary. However, the asset database 728 can provide redundancy in the system or be used for quick checks on the product ownership status, and/or product status, as well as updating product ownership database 720.

By enabling the use of a hybrid block-chain ledger architecture in accordance with various embodiments, partial ownership of assets, and real-time tracking of individual owner entity contributions spread over the entire ownership structure, may be tracked. The real-time tracking provided by various embodiments may be useful in partial ownership situations with complex disbursement schemes. For example, system 140 may perform operations that automatically disburse profits according to the ownership allocation and/or disbursement arrangements and/or create new genesis blocks based on the ownership instructions set forth within event trigger list 322 and/or rules engine 324.

For instance, a husband and wife may jointly purchase a car for $10,000. Upon the completion of payment for the car, system 140 may determine that husband contributed 60% of the cost, and the wife contributed 40% of the cost. In some aspects, rules engine 324 may include rules establishing joint ownership of the car on the basis of the proportional contributions of the husband and wife, and in the event of divorce (e.g., a triggering event within event trigger list 322), system 140 may distribute the ownership in accordance with rules engine 324.

Figure 7B:
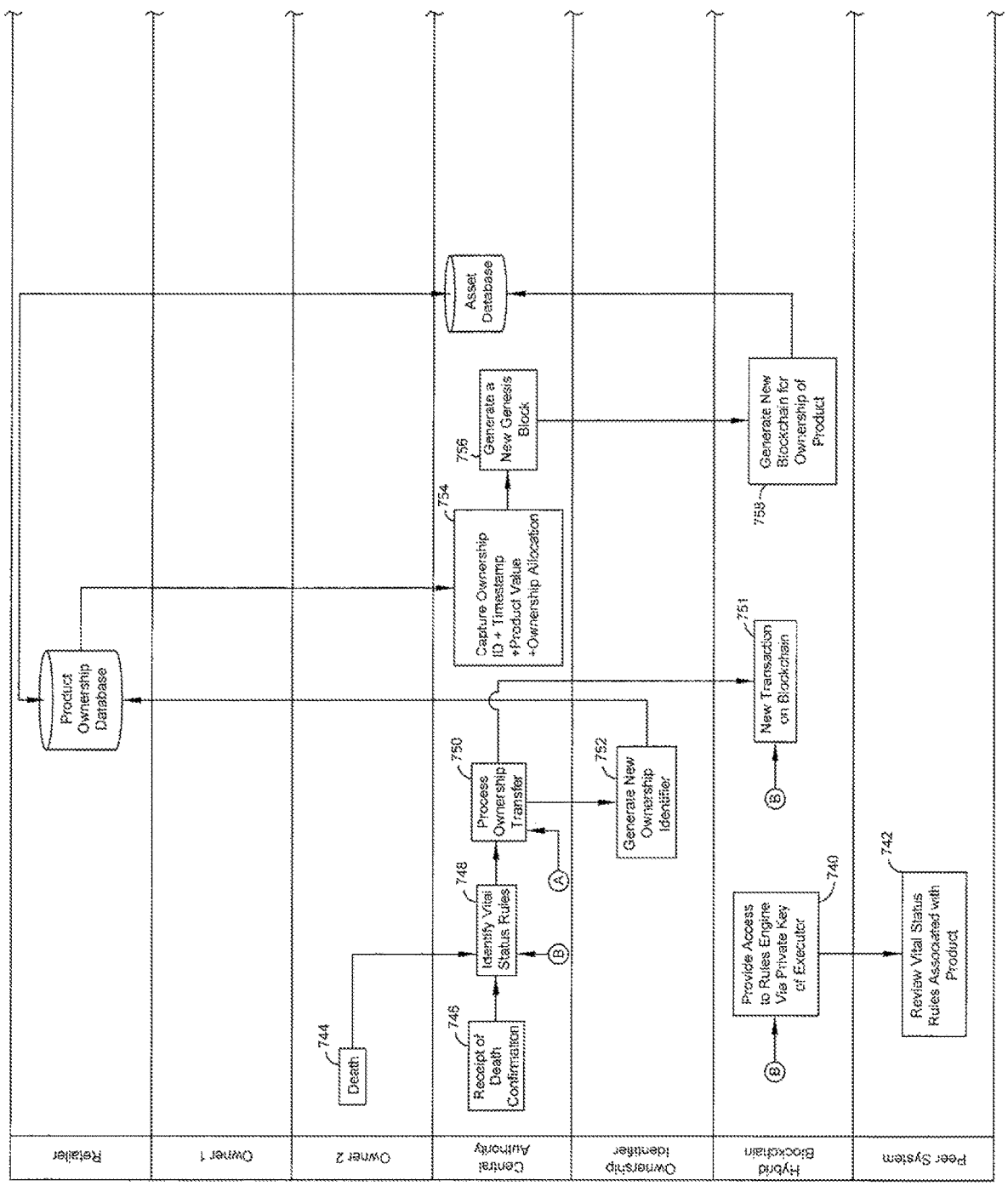
Figure 7C:
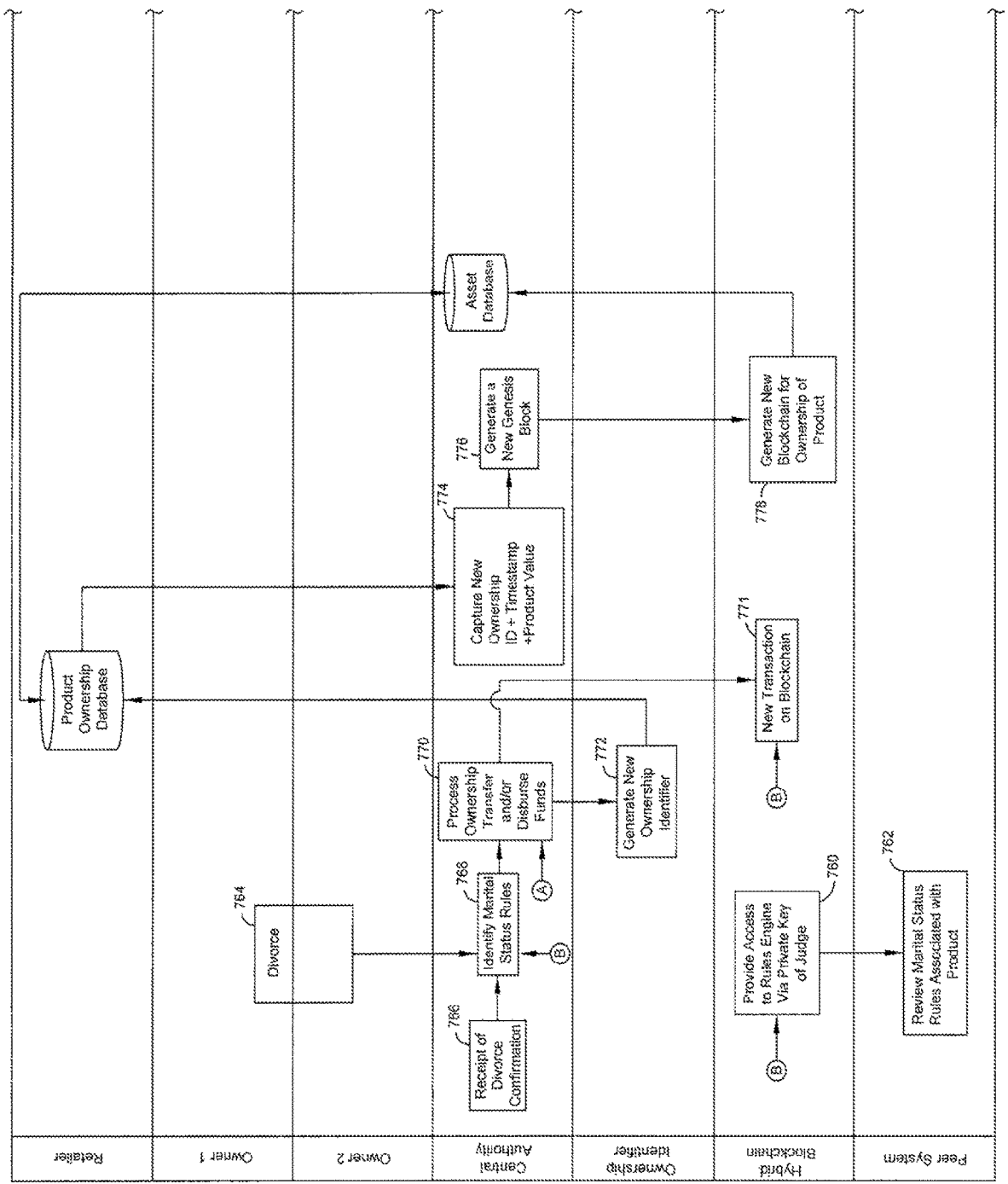

Referring now to FIG. 7C, using a hybrid block-chain ledger for tracking product information, including the ownership, of a tangible good (e.g. a manufactured product), in some embodiments is provided. The ownership rules (including ownership allocation rules) are available (at 760) in the rules engine of the hybrid block-chain. For example, either of the joint owners, an owner's attorney, the judge in a case involving an owner, etc. can access the rules engine (at 760) in the block-chain to verify the rules of ownership associated with the product based on the marital status of joint owners 1 and 2. Specifically, any of these entities can have access to the ownership rules (via its relationship with one of the joint owners, the retailer, and/or the central authority) and validate those rules against the information in the hybrid block-chain using its private crypto key.

At 764, event information detailing a divorce event between joint owners 1 and 2, and/or confirmation of such divorce event (766), is received by the central authority. At 768, the central authority determines whether a triggering event corresponding to the reported and/or confirmed divorce event is stored in the event trigger list associated with the ownership ID for the particular product(s). At 768, based on determining that the reported and/or confirmed divorce event has a corresponding triggering event, the central authority identifies a marital status rule associated with the corresponding triggering event (768). In these operations, the central authority validates the divorce transaction against the rules/trigger events associated with the ownership ID for the particular product. At 770, the central authority performs an action specified by the identified marital status rule to process the divorce transaction. For example, the central authority may process an ownership transfer between joint owners 1 and 2, or from the joint owners to another entity, in accordance with the marital status rule. By way of another example, the central authority may disburse funds between joint owners 1 and 2, or to or from one or both of the joint owners and another entity, in accordance with the marital status rule. The asset database of the central authority may be updated to reflect the most recent ownership status of the product.

At 772, the new ownership of the product is associated with a new ownership identifier. In various embodiments, the ownership identifier is associated with the resulting ownership from the processed ownership transfer performed by the central authority in accordance with the identified marital status rule (770). The new ownership ID and other pertinent information about the product may be entered into a product ownership database of the retailer and/or central authority. At 774, the central authority captures relevant information from the new owner (e.g. owner 1, owner 2, or another owner entity), for starting a new hybrid-block chain ledger associated with the transferred ownership of the particular product. This information includes the new ownership ID, and all intended rules associated with the new ownership ID. In various embodiments, this information also includes a timestamp of the ownership transfer, the current product value, and/or the new ownership allocation (if any). In various embodiments, this information also includes a product identifier (not shown) and all intended rules associated with the product identifier.

At 776, the central authority generates a new genesis block for a new hybrid block chain. This genesis block includes the new ownership ID information as well as the rules engine and event trigger list (described above) associated with the new ownership ID. At 778, the central authority or other node in the network generates a new block-chain associated with the new product(s) ownership being tracked, using the genesis block generated at 776. This block-chain is used to update the central authority's asset database with the information associated with the new ownership of the product (e.g., new ownership ID, rules and trigger events). Information in the product ownership database can be updated from the asset database as reflected in FIG. 7C.

Various embodiments are, however, not limited to property settlements subsequent to divorce, and event trigger list 322 and/or rules engine 324 may include additional data, such as, for example data that supports the disbursement of profits upon sales of items and/or within a partnership. For example, a startup company may exhibit a distributed ownership structure including three co-founders and an investor owner. Rules engine 324 may include an existing payment structure rule that specifies a distribution of profits among the co-founders and the investor. When the startup company is acquired or receives funding, system 140 may detect a triggering event, and rules engine 322 proceeds to create a new ownership structure, and create a new genesis block.

Figure 7D:
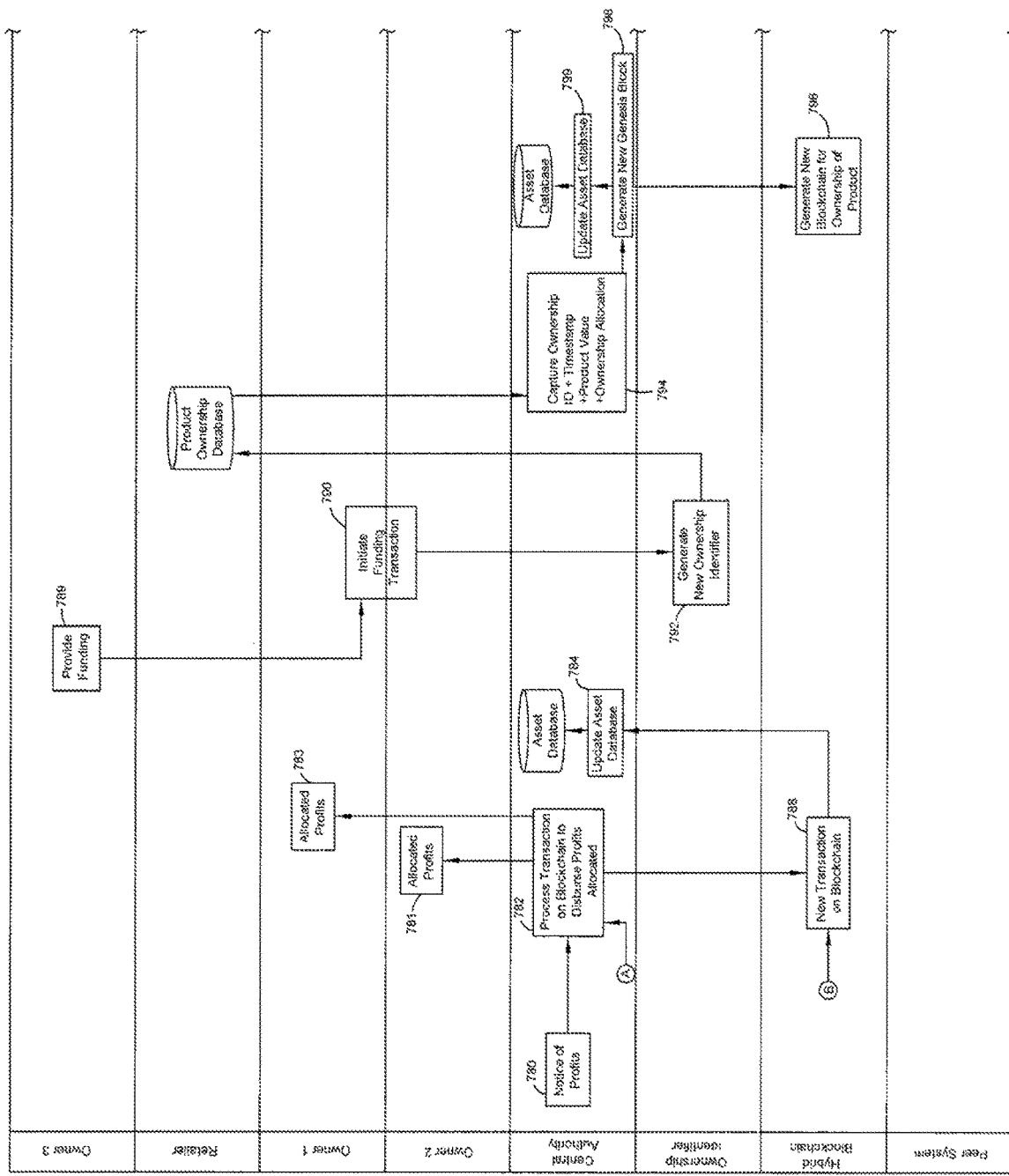

Referring now to FIG. 7D, using a hybrid block-chain ledger for tracking product information, including the joint ownership of a business (e.g. co-founders of a business) in some embodiments is provided. The ownership rules (including ownership allocation rules) are available in the rules engine of the hybrid block-chain. At 780, event information detailing business profits for a particular time period is received by the central authority. In various embodiments, each time business profits for a particular time period are received, the asset database is updated and optionally the product ownership database. Specifically, a new transaction is written into the block-chain to validate that it is a valid transaction according to the originating rules (from the joint owners (e.g. co-founders of the business) and/or central authority) for the particular ownership of the particular business. Details of the business profits transaction are reported to the central authority (780) to update the asset database (784) and this transaction is processed on the block-chain (782) by the central authority. In that operation, the central authority validates the transaction against the rules/trigger events associated with the ownership ID for the particular business. The central authority may also automatically disburse respective allocated profits (781, 783) to joint owner 2 and joint owner 1 in accordance with the rules relating to the allocation of profits based on ownership interest of the business between the first and second joint owners. At 788, this new transaction (receipt of business profits for a particular time period) is reflected as a new transaction on the block-chain in accordance with the description of the hybrid block-chain set forth above.

As illustrated in FIG. 7D, at 789, new joint owner 3 (e.g. new investor) provides funding for the product (e.g. the business previously co-owned by joint owners 1 and 2). At 790, the first joint owner and the second joint owner initiate a funding transaction of the product. The new joint ownership of the product by the first, second, and third joint owners is associated with a new ownership identifier (792). In various embodiments, the new ownership identifier (792) is associated with the resulting ownership from the initiated funding transaction 790. The new ownership ID (792) and other pertinent information about the business may be entered into a product ownership database that is, for example, maintained by the joint owners and/or the central authority. At 794, the central authority captures relevant information from the new joint ownership entities (e.g. owner 1, owner 2, and owner 3), for starting a new hybrid-block chain ledger associated with the new ownership of the particular business. This information includes the new ownership ID, and all intended rules associated with the new ownership ID. In various embodiments, this information also includes a timestamp of the funding transaction, the current business value, and/or the new ownership allocation. In various embodiments, this information also includes a business identifier (not shown) and all intended rules associated with the business identifier.

At 798, the central authority generates a new genesis block for a new hybrid block chain. This genesis block includes the new ownership ID information as well as the rules engine and event trigger list (described above) associated with the new ownership ID. At 796, the central authority or other node in the network generates a new block-chain associated with the new business ownership being tracked, using the genesis block generated at 798. This block-chain is used to update the central authority's asset database with the information associated with the new ownership of the business (e.g., new ownership ID, rules and trigger events) (799). Information in the business ownership database can be updated from the asset database as reflected in FIG. 7D.

Automated Ownership Transfers

The traditional block-chain ledger architecture makes all entries sequentially in a wide range of applications, which can lead to delays in executing the transactions. Thus, such traditional block chains are unable to efficiently execute transactions that follow a standardized set of rules based on events associated with the owner. By enabling the use of a hybrid block-chain ledger, these problems are obviated as such use facilitates, for example, a transfer of ownership of tracked assets in response to an occurrence of a set of standardized events. By enabling the use of such hybrid block-chains, disbursement and ownership transfers are expedited, and the need for protracted analysis of the ownership structures is reduced if not eliminated.

Various embodiments may track an ownership of connected devices based on a unique ownership identifier and periodic checks with a network connection, which may be aggregated with associated data (e.g., value, purchase time, usage duration, maintenance status, maintenance milestone, performance threshold, geo-location, etc.) to form a connected asset inventory system. If items cannot periodically check into the ownership network, system 140 may prompt the customer (e.g. one or more joint owners) to reconcile, or a public network may request independent verification.

Various embodiments may also establish a number of predetermined trigger conditions which, when triggered, execute the sale or disbursement and re-allocation of ownership of items registered with the connected asset inventory system. These predetermined instructions may be stored on a distributed electronic ledger system (e.g. hybrid block-chain), and the event and completion of the disbursement may be validated by the public "miners" (e.g., peer systems 160).

In some embodiments, transactions related to ownership of a particular property (e.g. an IoT-enabled property) may be added to the exemplary hybrid block-chain ledgers described above. System 140, acting on behalf of the centralized authority (i.e., business entity 150) may generate a genesis block in partnership with a manufacturer/retailer at the time of purchase of the particular property (e.g. genesis block including ownership identifier information, of the owner(s) having a registered ownership interest in the particular IoT-enabled property, as well as the rules engine and event trigger list (described above) associated with the ownership identifier), and/or appends information from a genesis block created by the manufacturer (e.g. genesis block including product identifier information for the particular IoT-enabled property, as well as the rules engine and event trigger list (described above) associated with the product identifier). System 140 may also generate a set of rules for ownership transfer based on input from the individuals involved in the transfer, which may be incorporated into the hybrid block chain ledger as a rules engine (e.g., rules engine 324). Public portions of hybrid block-chain ledgers in accordance with various embodiments may verify a current status of ownership, and when a preset event or criteria is reached (e.g., within event trigger list 322), system 140 performs operations that initiate a transfer of ownership of the property based on the established rules, and the ownership transfer is updated through the distributed network.

For instance, life insurance claims processes may proceed upon a death of a family member and a receipt of an official "certified" death certificate from a governmental entity (e.g., trigger events). Various embodiments may require that the ledger "miners" of peer systems 160 validate the trigger events as well as validate the completion of the "disbursement" or payment event.

During estate planning, various embodiments may "tag" or track every asset that uses a network connection to generate and create rules around automatic disbursements. Upon an event trigger/confirmation (e.g., as specified in event trigger list 322), system 140 automatically puts into effects the rules created by a customer (e.g., as stored within rules engine 324). The automated transfer of ownership may, in some aspects, reduce the workload of an executor and track all changes made to the event triggers, which allows for greater clarity.

With reference to FIG. 7B, using a hybrid block-chain ledger for tracking product information, including the ownership, of tangible good(s), in some embodiments is provided. The ownership rules (including ownership allocation rules) are available (at 760) in the rules engine of the hybrid block-chain. For example, either of the joint owners, an owner's attorney, the judge in a case involving an owner, an executor of the estate of either or both of the joint owners, etc. can access the rules engine (at 760) in the block-chain to verify the rules of ownership associated with the product based on the vital status of one or both of joint owners 1 and 2. Specifically, any of these entities can have access to the ownership rules (via its relationship with one of the joint owners, the retailer, and/or the central authority) and validate those rules against the information in the hybrid block-chain using its private crypto key.

At 744, event information detailing a death event of joint owner 2, and/or confirmation of such death event (746), is received by the central authority. At 748, the central authority determines whether a triggering event corresponding to the reported and/or confirmed death event is stored in the event trigger list associated with the ownership ID for the particular product(s). At 748, based on determining that the reported and/or confirmed death event has a corresponding triggering event, the central authority identifies a vital status rule associated with the corresponding triggering event (748). In these operations, the central authority validates the death of joint owner 2 transaction against the rules/trigger events associated with the ownership ID for the particular product(s). At 750, the central authority performs an action specified by the identified vital status rule to process the death transaction. For example, the central authority may process an ownership interest transfer from joint owner 2 to joint owner 1 and/or another entity in accordance with the vital status rule. By way of another example, the central authority may disburse funds from an estate account of joint owner 2 to joint owner 1 and/or another entity in accordance with the vital status rule. The asset database of the central authority may be updated to reflect the most recent ownership status of the product(s).

At 752, the new ownership of the product(s) is associated with a new ownership identifier. In various embodiments, the ownership identifier is associated with the resulting ownership from the processed ownership transfer performed by the central authority in accordance with the identified vital status rule (750). The new ownership ID and other pertinent information about the product(s) may be entered into a product ownership database of the retailer and/or central authority. At 754, the central authority captures relevant information from the new owner (e.g. owner 1, another owner entity, owner 1 and another owner entity), for starting a new hybrid-block chain ledger associated with the transferred ownership of the particular product(s). This information includes the new ownership ID, and all intended rules associated with the new ownership ID. In various embodiments, this information also includes a timestamp of the ownership transfer, the current product(s) value, and/or the new ownership allocation (if any). In various embodiments, this information also includes a product identifier (not shown) and all intended rules associated with the product identifier.

At 756, the central authority generates a new genesis block for a new hybrid block chain. This genesis block includes the new ownership ID information as well as the rules engine and event trigger list (described above) associated with the new ownership ID. At 758, the central authority or other node in the network generates a new block-chain associated with the new product(s) ownership being tracked, using the genesis block generated at 756. This block-chain is used to update the central authority's asset database with the information associated with the new ownership of the product (e.g., new ownership ID, rules and trigger events). Information in the product ownership database can be updated from the asset database as reflected in FIG. 7B.

By using distributed electronic ledgers (e.g. hybrid block chain ledgers), which have only been possible in the computerized, Internet era, the transactions corresponding to various stages of ownership interest in products, and the value and status of such products, are updated in a secure manner that provides complete record checking capability in an efficient manner, as well as automatic ownership interest allocation and funds distribution between joint owner(s) of products. By using private keys to sign transactions, a high level of security is enforced, but the use of a public key to sign transactions may be acceptable if the parties agreed to that procedure.

Figure 8:
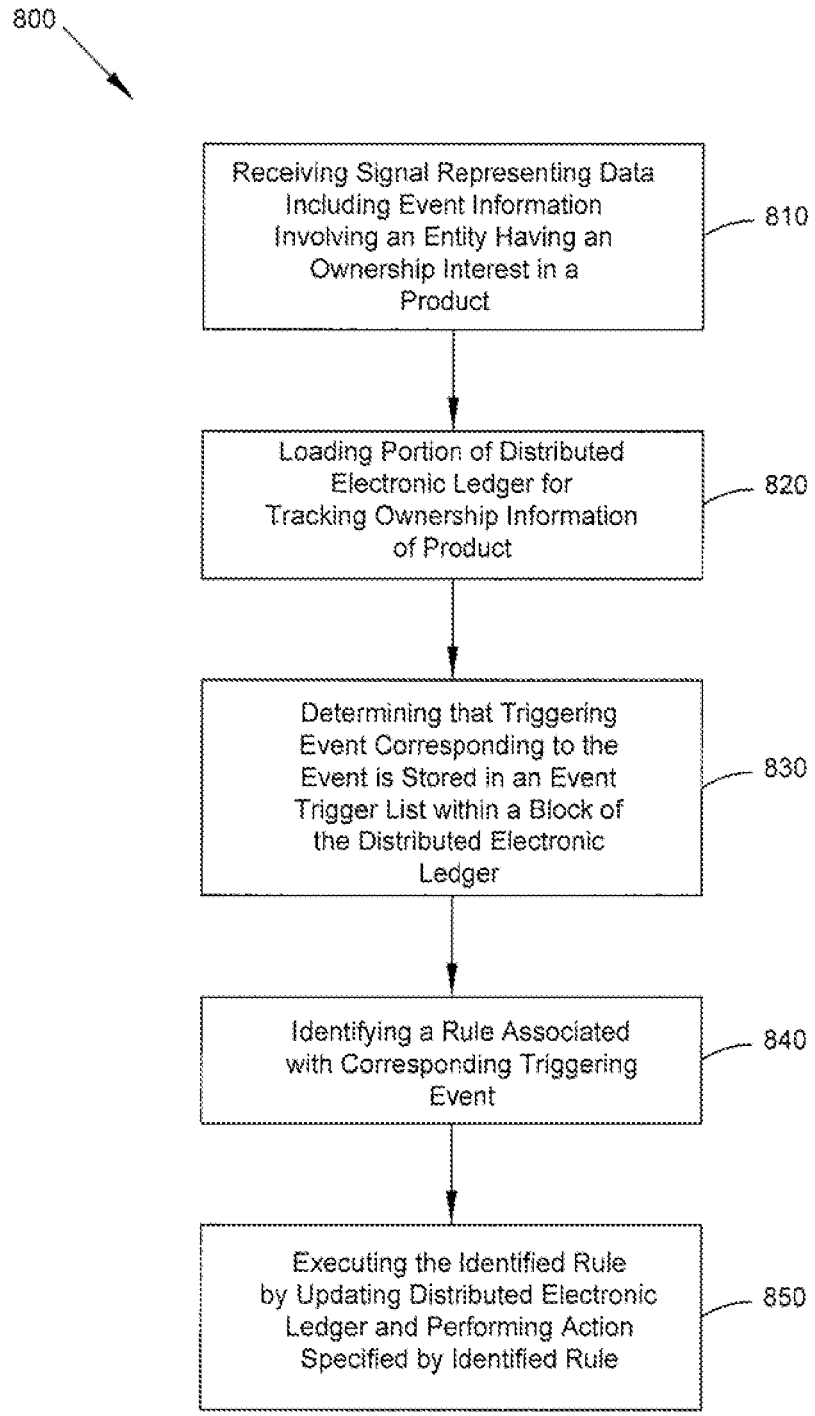
FIG. 8 is a flow diagram of a process in accordance with some embodiments.

FIG. 8 is a flow diagram of a process 800 in accordance with some embodiments. Process 800 includes receiving (810) with a processor a signal representing data including event information detailing an event involving an entity having an ownership interest in a product. In various embodiments, the event may involve a product such as a manufactured product. In various embodiments, the product is a connected device and at least a part of the event information is obtained from the product when in a connected state. In various embodiments, the event may involve at least one of plural entities each having a respective registered ownership interest in the product. In some embodiments, the event involves an entity having an ownership interest in a plurality of products. In various embodiments, the event information includes an ownership identifier associated with the product. In some embodiments, the ownership identifier is associated with all of the entities having a respective registered ownership interest in the product. A computer processor loads (820) a portion of a distributed electronic ledger for tracking ownership information associated with the product. In various embodiments, the distributed electronic ledger includes, within a block thereof and associated with the product, an event trigger list including entity data associated with each of the plural entities and a rules engine including rules associated with event triggers in the event trigger list. In various embodiments, the event trigger list includes entity data associated with each of plural entities each having a respective registered ownership interest in the product and a rules engine including rules associated with event triggers in the event trigger list. In some embodiments, the rules define ownership transfer terms, ownership interest allocation terms, and/or funds distribution terms, associated with the product.

A computer processor determines (830) that a triggering event corresponding to the event is stored in an event trigger list within a block of the distributed electronic ledger. In some embodiments, the computer processor determines (820) whether a respective triggering event corresponding to the event is stored in a respective event trigger list within each of a plurality of distributed electronic ledgers for respectively tracking information associated with a respective one of the plurality of products. Based on determining that the event has a corresponding triggering event, the computer processor identifies a rule associated with the corresponding triggering event (840). In various embodiments, the processor stores the rule in a rules engine within the distributed electronic ledger. In various embodiments, the processor stores at least one ownership interest allocation term, ownership transfer term, or funds distribution term associated with the product in the rules engine. In various embodiments, at least a portion of the distributed electronic ledger is stored at a storage device. In some embodiments, based on determining that the event has a corresponding respective triggering event, the computer processor determines a respective rule associated with the respective corresponding triggering event, wherein the respective rule is stored in a respective rules engine within the respective distributed ledger.

The identified rule is executed (850) with the processor by updating the distributed electronic ledger and performing an action specified by the identified rule. In various embodiments, the action includes processing the transfer of an entity's registered ownership interest in the product to another entity. In some embodiments, the action includes approving a transfer of an entity's registered ownership interest in the product to another entity, and the processor is programmed to update the distributed electronic ledger responsive to approving the transfer. In some embodiments, the action is processing the re-allocation of a portion of the registered ownership interest of at least one of plural entities each having a respective registered ownership interest in a product to another one of the plural entities. In various embodiments, each of a plurality of distributed electronic ledgers are updated by performing a respective action specified by a respective determined rule.

Processes for Tracking Earmarked Distributions

Many electronic funds transfers are earmarked for specific uses and/or for specific purchases of certain types of products (e.g., earmarked donations, child support, welfare, child's allowance, some government grants, etc.). Using conventional processes, it may be difficult to track and verify that the allotted funds are used strictly on allowed purchases. Furthermore, using conventional processes, an individual that provides funds may rely on reports that the funds have been used appropriately, and moreover, the appropriate use of funds may often be taken on faith.

In various embodiments, a hybrid block-chain ledger can create and enforce rules controlling transfer of earmarked funds, thus providing a systematic mechanism for tracking and controlling spending. For example, system 140 may establish (e.g., in rules engine 324) a set of allowed transaction rules that enforce the set of earmarks for particular funds.

In some aspects, these systems could be used in international remittance, where funds are sent for specific uses. If the transaction is earmarked for specific items and/or types of items, the established rules may be incorporated into an encrypted event trigger list and/or rules engine (e.g., by system 140) within the transaction block sending the funds overseas. The recipient of the fund will be able to review the trigger events that facilitate a use of the particular funds. If the recipient attempts to use the funds in a way that violates the transaction earmarks, the transaction may be refused, and/or the provider of the fund may be notified.

In some aspects, system 140 may establish rules within the rules engine (e.g., rules engine 324) that allow compliant transactions to proceed, while initiating a set of contingency steps transactions outside of the earmarks. These steps may include notifying the originating party, flagging the transaction, and/or denying the transaction.

For example, a customer of business entity 150 (e.g., user 110) may intend to send money to his parents to repair their roof in a remote village in China. User 110's parents do not have a bank account, so user 110 must send the money through an intermediary (e.g., user 112). User 110 may worry that user 112 may use the funds inappropriately, leading to an unrepaired roof. In some aspects, user 110 may transfer funds using the exemplary hybrid block-chain described above, and may establish (e.g., within event trigger list 322 and/or rules engine 324) an earmark for a contractor already selected for the roof repairs. Although user 112 believes she can get a better deal by getting the roof repaired by a different contractor, user 112 accesses event trigger list 322 (e.g., using user 112's private crypto key) and determines that the different contractor cannot be paid with user 110's funds.

Shipping Beacons

The consumer market is moving towards a model where purchases are often made directly from manufacturers. In some instances, as the point of purchase becomes closer and closer to the manufacturers, inherent problems exist in tracking and paying for these goods in an equitable way that protects both the manufacturer and the purchaser. For example, using conventional processes, a cost of a product is paid up-front by a purchaser, who relies on the seller's reputation and ethical behavior to produce and ship the product. As smaller manufacturers enter the marketplace and purchases are made on a global scale, these conventional payment processes are often unable to account for the realities of modern consumer and manufacturer behavior.

In various embodiments, hybrid block-chain ledgers provide a basis for a payment system that tracks the good/product through its shipping route, thus mitigating risks associated with remote purchases, and incentivizing a manufacturer to produce and ship its products on schedule. For example, upon the purchase of a product from a manufacturer, system 140 may establish a payment and shipment schedule, which may be included within event trigger list 322 and/or rules engine 324. Further, upon acceptance of the conditions by the manufacturer, system 140 may disburse an initial amount of funds to the manufacturer and create an appropriate genesis/new block.

A trusted shipping party (e.g., FedEx™, DHL™, etc.) may utilize a private key to sign transactions along one or more stages of shipping of the product, and a partial disbursement of funds may occur at these stages to both the trusted shipping party and the manufacturer. As the shipment crosses set target checkpoints (e.g., international borders, customs, provincial/state boundaries, etc.) further partial disbursement is made as the trusted shipping party signs transactions within the hybrid block-chain ledger. When the purchaser signs the receipt of the product into the hybrid block-chain ledger, system 140 may perform operations to make the final disbursement, thus settling all accounts of the shipment.

For example, a customer of business entity 150 (e.g., user 110) may purchase ten barbeque grills from an overseas manufacturer for use and distribution to friends and family. User 110 may approach business entity 150 and request establishment of a disbursement schedule for the manufacturer based on the exemplary hybrid block-chain ledgers described above. System 140 may, in some aspects, create a transaction in the hybrid block-chain ledger that holds user 110's payment (e.g., an escrow account), and system 140 may establish rules that sequentially disburse the payment when the item ship, when the items clear customs, when they are in the same town as user 110, and finally when user 110 is able to sign for items after inspection.

Clearinghouse Models for Contract Settlement

In some instances, "smart contracts" that leverage conventional block-chain ledgers may serve to enforce agreements in a timely and efficient manner, creating a permanent record of the transaction with all the enforceable rules associated with the contracts. In further aspects, the use of the exemplary hybrid block-chain ledgers described above allows the terms of these smart contracts to be modified by a centralized authority to accommodate the changing realities of the real world. Problems remain, however, surrounding the reconciliation of disputes and/or the initiation of transactions by the centralized authority to correct problems in the list of transactions.

Hybrid block-chain ledgers may be further augmented to include a "side" block-chain ledger that tracks any automated transactions initiated either by the rules residing on the hybrid block-chain ledger (e.g., event trigger list 322 and/or rules engine 324) or by a centralized authority having power to enact a transaction outside of normal transaction usage.

When a rule-based or centralized-authority-initiated transaction occurs, the associated supporting documentation and triggering events may be tracked in a special transaction category that requires validation by a neutral third party to verify that the transaction is in accordance with the set of rules/agreements allowed on those particular smart contracts. These processes allow for reconciliation of assets, funds, and ledger tracked items via a neutral third party. Various embodiments may also allow for parties involved in the transaction to request reviews of transactions in cases of errors or conflicting triggering events, and a neutral third party may act as an arbitrator in the cases where conflict exists.

For example, various embodiments enable a customer of business entity 150 (e.g., user 110) to create, within a hybrid block-chain ledger, a set of rules pertaining to a smart contract involving a contractor renovating user 110's house. The smart contract may specify scheduled disbursements based on mutually agreed-upon inspections of work. In one instance, the contractor presents an inspection report to a corresponding financial institution to receive a scheduled disbursement. Upon receipt of a notification of the disbursement, user 110 requests that system 140 recovers the disbursement, and user 110 has not completed the requisite and triggering inspection, and system 140 generates non-compliance rules (e.g., within rules engine 324 using the master key or within the side block-chain) to recover user 110's funds. The contractor may, however, argue to the financial institution that the required inspection has occurred and provides a corresponding report (that was not signed off by user 110's private key). Business entity 150 and the contractor's financial institution may initiate an automated arbitration between user 110 and the contractor against the terms of the smart contract. The arbitration finds in favor of user 110, who recovers the funds, and system 140 records the arbitration decision into corresponding transaction data for submission to peer systems 160.

Document Tracking Using Hybrid Block-Chain Ledgers

Processes that maintain deeds and other important documents are crucial for proper record keeping and accessibility. Records are maintained in a secure, accessible repository and available to prove ownership or an occurrence of an event in a case of conflicting documentation. For example, a document may be hashed into a hybrid block-chain ledger using a secure, known technique. In some embodiments, an image (e.g., from a camera) of the document is hashed. The hashed document may also be used in the case of transactions, and an ownership chain may be maintained. Using hybrid block-chain ledgers may enable financial institutions and other entities that provide loans secured against any of these deeds to automatically execute liens in the case of default on the loan. Further, the use of secured images may also provide further security, especially in a case of conflicting documentation.

Counterfeit Prevention

Processes that prevent an introduction of counterfeit manufactured goods into the marketplace are essential to preserve the intellectual property rights of manufacturers and ensure that criminal activities do not negatively affect legitimate manufacturers. In many instances, however, manufacturers lose track of their goods once they leave their manufacturing plant and move into the hands of shipping partners or distribution partners, leaving the possibility that losses may occur before a customer is able to purchase the product. Various embodiments may provide a mechanism to track a legitimate product through its lifecycle and to control and confirm transactions involving the legitimate product, thus reducing an ability of counterfeiters to enter and disrupt the marketplace.

For example, hybrid block-chain ledgers in accordance with various embodiments may function as a public repository of products that tracks ownership chains. Hybrid block-chain ledgers may also provide a centralized authority functionality that enables manufacturers to establish rules regarding transactions (e.g., minimum pricing, authorized dealer location, etc.). The centralized authority functionality may also be shared with a financial institution (e.g., business entity 150) to control financing terms or transaction funds.

While conventional block-chain ledgers may enable an individual to verify if the product has an authentic chain of custody, manufacturers have very little control over the distribution channels and how their products are traded. In some embodiments, these same manufacturers have the ability to identify goods not offered for sale, and to set targeted minimum pricing for certain geographies to address "grey-market activities" associated with these products.

For instance, a customer of business entity 150 may be a manufacturer and direct sale merchant of a specialized biomedical product with strict export regulations and a targeted regional sale strategy. The customer may work with business entity 150 to incorporate regional sales rules into a hybrid block-chain ledger for each product during manufacturing (e.g., within event trigger list 322 and rules engine 324). Due to import restrictions, one of the rules may specify a location of sales for each product, and a manufacturer may receive an automated message indicating that a product intended for a developing market is being transacted in the Europe. Working with business entity 150 and local authorities, the financial transaction is flagged, and the product is recovered due to usage agreement violations. In some aspects, system 140 performs operations that revert an immediately prior transaction back to the customer to facilitate the recovery of the customer's products for proper deployments.

Value Tracking Using Block-Chain Ledgers to Capture Customer Interactions

Today, a deep understanding of the relationship between a customer and a business is paramount for delivering a positive customer experience. Unfortunately, the fragmented nature of existing corporate structures presents a complex challenge in trying to accurately capture the various touch points experienced by a customer. This is especially true of large corporate entities such as financial institutions, which offer a wide portfolio of products which may operate as separate lines-of-businesses (LOBs) under the same corporate banner. The fragmented nation of these existing corporate structures can thus lead to multiple approaches in providing customer service. The lack of cross-LOB integration may lead to an environment with very low cohesive customer management, which may also lead to an inability to track and quantify cross-LOB referrals and interactions.

Various embodiments provide mechanisms for tracking customer interactions across different LOB's that provide not only a customer-centric view, but also with techniques for tracking the intrinsic value of each interaction with the customer.

In some aspects, the exemplary hybrid block-chain ledgers described above may be configured to track and reward referral programs for a single customer in a multi-LOB environment. Within a hybrid block-chain ledger, the interactions and activities between a customer and staff can be recorded as a transaction, and the value generated by the transaction can be added to the hybrid block-chain ledger and compared to the expected value of the referral. Effectively tracking the value of each interaction and referrals allows greater visibility and transparency of the value generation chain. This increased transparency can be used to optimize the incentives for all participants.

Systems and processes in accordance with various embodiments may integrate all communication channels into a single tracking system, and provide a platform upon which referrals can be monetized. These systems and processes can further increase the value proposition for each customer going through this interaction. Thus, various have advantages over existing systems which leverage conventional block-chain ledgers.

Hybrid block-chain ledgers can further be augmented by allowing for incentives and payouts to occur in the transaction and allowing for direct justification of the payouts. The augmentation reduces the need to maintain records of all transaction, referrals and sales as it would be integrated into a single location in the hybrid block-chain ledgers.

In the hybrid block-chain model described above, the rules surrounding how incentives and payouts are made can be controlled by a central authority, thereby automating the referral processes (e.g., in event trigger list 322 and/or rules engine 324). The participants can view the triggers which can translate to the actions, or thresholds associated with the incentives. The actual distribution can be controlled by the rules engine hashed within in the exemplary hybrid block-chain ledger.

In some aspects, system 140 combines multiple trigger events (e.g., within event trigger list 322) to invoke the rules engine (e.g., rules engine 324), which may change the set rewards and incentives. The multiple trigger events may include a certain transaction value, sale, customer interaction, a referral, and/or a combination thereof.

The apparatuses and processes are not limited to the specific embodiments described herein. In addition, components of each apparatus and each process can be practiced independent and separate from other components and processes described herein.

The previous description of embodiments is provided to enable any person skilled in the art to practice the disclosure. The various modifications to these embodiments will be readily apparent to those skilled in the art, and the generic principles defined herein may be applied to other embodiments without the use of inventive faculty. The present disclosure is not intended to be limited to the embodiments shown herein, but is to be accorded the widest scope consistent with the principles and novel features disclosed herein.

What is claimed is:

1. An apparatus, comprising:
   a memory storing instructions; and
   at least one processor coupled to the memory, the at least one processor being configured to execute the instructions to:

access data maintained within a first ledger block of a distributed ledger associated with a first entity, and based on the accessed data, determine an occurrence of an event associated with a product;

based on determining the occurrence of the event:
  decrypt an encrypted first portion of the accessed data using a master cryptographic key associated with a rules authority, the decrypted first portion of the accessed data identifying a plurality of rules associated with the rules authority;
  decrypt an encrypted second portion of the accessed data using a private cryptographic key associated with the product, the decrypted second portion of the accessed data identifying a plurality of triggering events;
  determine that the event corresponds to at least one of the triggering events; and
  when the event corresponds to the at least one of the triggering events, identify at least one of the plurality of rules that exhibits the relationship with the event; and
  perform operations consistent with the at least one of the plurality of rules that exhibits a relationship with the event, the operations comprising generating a second ledger block that includes: (i) event data associated with the event and (ii) a plurality of additional rules, and the second ledger block being recorded within an additional distributed ledger associated with the product and a second entity, wherein the plurality of rules and the plurality of additional rules differ.

2. The apparatus of claim 1, wherein the second ledger block corresponds to a genesis block for the additional distributed ledger.

3. The apparatus of claim 2, wherein the at least one processor is further configured to execute the instructions to generate the additional distributed ledger associated with the product, and to store the additional distributed ledger within a portion of the memory.

4. The apparatus of claim 2, wherein the at least one processor is further configured to transmit the second ledger block to one or more peer computing systems, the one or more peer computing systems being configured to generate the additional distributed ledger for the product.

5. The apparatus of claim 1, wherein the second ledger block comprises the event data, the encrypted first portion of the accessed data, and the encrypted second portion of the accessed data.

6. The apparatus of claim 1, wherein:
the product comprises a connected device, the connected device being communicatively coupled to the apparatus across a communications network;
the decrypted second portion of the accessed data includes product data associated with at least one of a maintenance of the product or a performance of the product; and
the event comprises a maintenance milestone or a performance threshold.

7. The apparatus of claim 6, wherein the operations further comprise generating and transmitting a notification to the connected device, the notification comprising at least a portion of the event data, and the connected device being configured to display the notification within a digital interface.

8. The apparatus of claim 1, wherein:
the decrypted first portion of the accessed data comprises entity data associated with an entity having a registered ownership interest in the product; and
the event data comprises an identifier of the entity having the registered ownership interest in the product.

9. The apparatus of claim 8, wherein the event comprises one of a change in a vital status of the entity having the registered ownership interest, the change in the vital status comprising at least one of a death or an incapacitation of the entity, a change in a marital status of the entity having the registered ownership interest, or a payment contribution of the entity having the registered ownership interest.

10. The apparatus of claim 8, wherein:
the operations further comprise generating ownership data indicative of a modification to the registered ownership interest of the entity in the product, the modification comprising at least one of an increase in the registered ownership interest, a decrease in the registered ownership interest, or a transfer of the registered ownership interest to an additional entity; and
the second ledger block comprises the event data and the ownership data.

11. A computer-implemented method, comprising:
using at least one processor, accessing data maintained within a first ledger block of a distributed ledger associated with a first entity, and based on the accessed data, determining an occurrence of an event associated with a product;
based on determining the occurrence of the event:
  decrypting, using the at least one processor, an encrypted first portion of the accessed data using a master cryptographic key associated with a rules authority, the decrypted first portion of the accessed data identifying a plurality of rules associated with the rules authority;
  decrypting, using the at least one processor, an encrypted second portion of the accessed data using a private cryptographic key associated with the product, the decrypted second portion of the accessed data identifying a plurality of triggering events;
  determining, using the at least one processor, that the event corresponds to at least one of the triggering events; and
  when the event corresponds to the at least one of the triggering events, identifying, using the at least one processor, the at least one of the rules that exhibits the relationship with the event; and
using the at least one processor, performing operations consistent with the at least one of the plurality of rules that exhibits a relationship with the event, the operations comprising generating a second ledger block that includes: a) event data associated with the event and (ii) a plurality of additional rules, and the second ledger block being recorded within an additional distributed ledger associated with the product and a second entity, wherein the plurality of rules and the plurality of additional rules differ.

12. The computer-implemented method of claim 11, wherein:
the second ledger block corresponds to a genesis block for the additional distributed ledger; and
the computer-implemented method further comprises, using the at least one processor, generating the additional distributed ledger associated with the product and storing the additional distributed ledger within a data repository.

13. The computer-implemented method of claim 11, wherein:
the second ledger block corresponds to a genesis block for the additional distributed ledger; and
the computer-implemented method further comprises transmitting the second ledger block to one or more peer computing systems using the at least one processor, the one or more peer computing systems being configured to generate the additional distributed ledger associated with the product.

14. The computer-implemented method of claim 11, wherein
the second ledger block comprises the event data, the encrypted first portion of the accessed data, and the encrypted second portion of the accessed data.

15. The computer-implemented method of claim 14, wherein:
the product comprises a connected device, the connected device being communicatively coupled to the apparatus across a communications network;
the decrypted second portion of the accessed data includes product data associated with at least one of a maintenance of the product or a performance of the product;
the event comprises a maintenance milestone or a performance threshold.

16. The computer-implemented method of claim 15, further comprising generating and transmitting a notification to the connected device using the at least one processor, the notification comprising at least a portion of the event data, and the connected device being configured to display the notification within a digital interface.

17. The computer-implemented method of claim 11, wherein:
the decrypted first portion of the accessed data comprises entity data associated with an entity having a registered ownership interest in the product;
the event data comprises an identifier of the entity having the registered ownership interest in the product; and
the event comprises one of a change in a vital status of the entity having the registered ownership interest, the change on in the vital status comprising at least one of a death and an incapacitation of the entity, a change in a marital status of the entity having the registered ownership interest, or a payment contribution of the entity having the registered ownership interest.

18. The computer-implemented method of claim 17, wherein:
the operations further comprise generating ownership data indicative of a modification to the registered ownership interest of the entity in the product, the modification comprising at least one of an increase in the registered ownership interest, a decrease in the registered ownership interest, or a transfer of the registered ownership interest to an additional entity; and
the second ledger block comprises the event data and the ownership data.

19. A tangible, non-transitory computer-readable medium storing instructions that, when executed by at least one processor, cause the at least one processor to perform a method, comprising:
accessing data maintained within a first ledger block of a distributed ledger associated with a first entity, and based on the accessed data, determining an occurrence of an event associated with a product;
based on determining the occurrence of the event:
decrypting an encrypted first portion of the accessed data using a master cryptographic key associated with a rules authority, the decrypted first portion of the accessed data identifying a plurality of rules associated with the rules authority;
decrypting an encrypted second portion of the accessed data using a private cryptographic key associated with the product, the decrypted second portion of the accessed data identifying a plurality of triggering events;
determining that the event corresponds to at least one of the triggering events; and
when the event corresponds to the at least one of the triggering events, identifying the at least one of the rules that exhibits the relationship with the event; and
performing operations consistent with the at least one of the plurality of rules that exhibits a relationship with the event, the operations comprising generating a second ledger block that includes: a) event data associated with the event and (ii) a plurality of additional rules, and the second ledger block being recorded within an additional distributed ledger associated with the product and a second entity, wherein the plurality of rules and the plurality of additional rules differ.

20. The apparatus of claim 1, wherein the at least one processor is further configured to execute the instructions to retrieve the master cryptographic key of the rules authority from a secure data repository.

21. The apparatus of claim 1, wherein the at least one processor is further configured to execute the instructions to:
modify the decrypted first portion of the accessed data, the modified first portion comprising a modification to at least one of the plurality of rules;
encrypt the modified first portion using the master cryptographic key; and
generate a third ledger block that includes the modified first portion, and perform operations that record the additional ledger block within the distributed ledger.

* * * * *